US012694272B1

(12) United States Patent
Shanker et al.

(10) Patent No.: US 12,694,272 B1
(45) Date of Patent: Jul. 28, 2026

(54) AI-ACCELERATED DATA SEQUENCE ENGINEERING SYSTEM

(71) Applicant: MANAS AI, INC., New York, NY (US)

(72) Inventors: Varun Shanker, Mountain View, CA (US); Siddhartha Mukherjee, New York, NY (US)

(73) Assignee: MANAS AI, INC., New York, NY (US)

( * ) Notice: Subject to any disclaimer, the term of this patent is extended or adjusted under 35 U.S.C. 154(b) by 0 days.

(21) Appl. No.: 19/087,112

(22) Filed: Mar. 21, 2025

(51) Int. Cl.
| | |
|---|---|
| *G01N 33/48* | (2006.01) |
| *G01N 33/50* | (2006.01) |
| *G06N 3/0455* | (2023.01) |
| *G06N 3/092* | (2023.01) |

(52) U.S. Cl.
CPC ........... *G06N 3/0455* (2023.01); *G06N 3/092* (2023.01)

(58) Field of Classification Search
CPC ............................. G06N 3/0455; G06N 3/092
See application file for complete search history.

(56) References Cited

PUBLICATIONS

Fujiki, Y., Fujiki, Y., Fujiki, Y., & Fujiki, Y. (2003). Functional complementation. In D. N. Cooper, Encyclopedia of the Human Genome (1st ed.). https://access.infobase.com/article/10404821-functional-complementation?aid=279753 (Year: 2003).*

Cai, H. et al., "Pretrainable geometric graph neural network for antibody affinity maturation," Nature Communications, vol. 15, Sep. 6, 2024, pp. 1-14.

Clavero-Alvarez, A. et al., "Humanization of Antibodies using a Statistical Inference Approach," Scientific Reports, vol. 8, Oct. 4, 2018, pp. 1-11.

Desautels, T. et al., "Computationally restoring the potency of a clinical antibody against Omicron," Nature, vol. 629, May 23, 2024, pp. 878-903.

He, H. et al., "De novo generation of SARS-CoV-2 antibody CDRH3 with a pre-trained generative large language model," Nature Communications, vol. 15, Aug. 10, 2024, pp. 1-19.

Hie, B. et al., "Efficient evolution of human antibodies from general protein language models," Nature Biotechnology, vol. 42, Apr. 24, 2023, pp. 275-283.

Li, L. et al., Machine learning optimization of candidate antibody yields highly diverse subnanomolar affinity antibody libraries, Nature Communications, vol. 14, Jun. 12, 2023, pp. 1-12.

Makowski, E. et al., "Co-optimization of therapeutic antibody affinity and specificity using machine learning models that generalize to novel mutational space," Nature Communications, vol. 13, Jul. 1, 2022, pp. 1-14.

Marks, C. et al., "Humanization of antibodies using a machine learning approach on large-scale repertoire data," Bioinformatics, vol. 37, Issue 22, pp. 4041-4047.

Mason, D. et al., "Optimization of therapeutic antibodies by predicting antigen specificity from antibody sequence via deep learning," Nature Biomedical Engineering, vol. 5, Apr. 15, 2021, pp. 600-612.

Ramon, A. et al., "Assessing antibody and nanobody nativeness for hit selection and humanization with AbNatiV," Nature Machine Intelligence, vol. 6, Jan. 15, 2024, pp. 74-91.

Ruffolo, J. et al., "Adapting protein language models for structure-conditioned design," bioRxiv preprint, Aug. 3, 2024, pp. 1-34.

Shanker, V. et al., "Unsupervised evolution of protein and antibody complexes with a structure-informed language model," Science, vol. 385, Jul. 5, 2024, pp. 46-53.

Vashchenko, D. et al., "AbBERT: Learning Antibody Humanness via Masked Language Modeling," bio Rxiv preprint, Aug. 1, 2022, pp. 1-6.

Zou, H. et al., "Antibody Humanization via Protein Language Model and Neighbor Retrieval," bioRxiv preprint, Sep. 6, 2023, pp. 1-23.

* cited by examiner

*Primary Examiner* — Russell S Negin
(74) *Attorney, Agent, or Firm* — Fenwick & West LLP

(57) ABSTRACT

An entity engineering system may engineer a data sequence derived from non-target data sources. The data sequence includes a majority of regions originating from one or more non-target data sources. The system may replace windows of data strings in the entity data sequence with target-compatible strings to generate a target-compatible intermediate candidate sequence. The system may identify one or more data loci in the target-compatible intermediate candidate sequence, wherein the data loci correspond to regions that interact with a target and are verifiable through analytical assessments. The system may input the target-compatible intermediate candidate sequence and the identified data loci into a deep neural network to generate a set of one or more improved target-compatible candidate sequences that exhibit higher association scores with the target. The system may use the one or more data loci as preservation constraints to ensure that critical interaction regions remain unchanged.

20 Claims, 11 Drawing Sheets

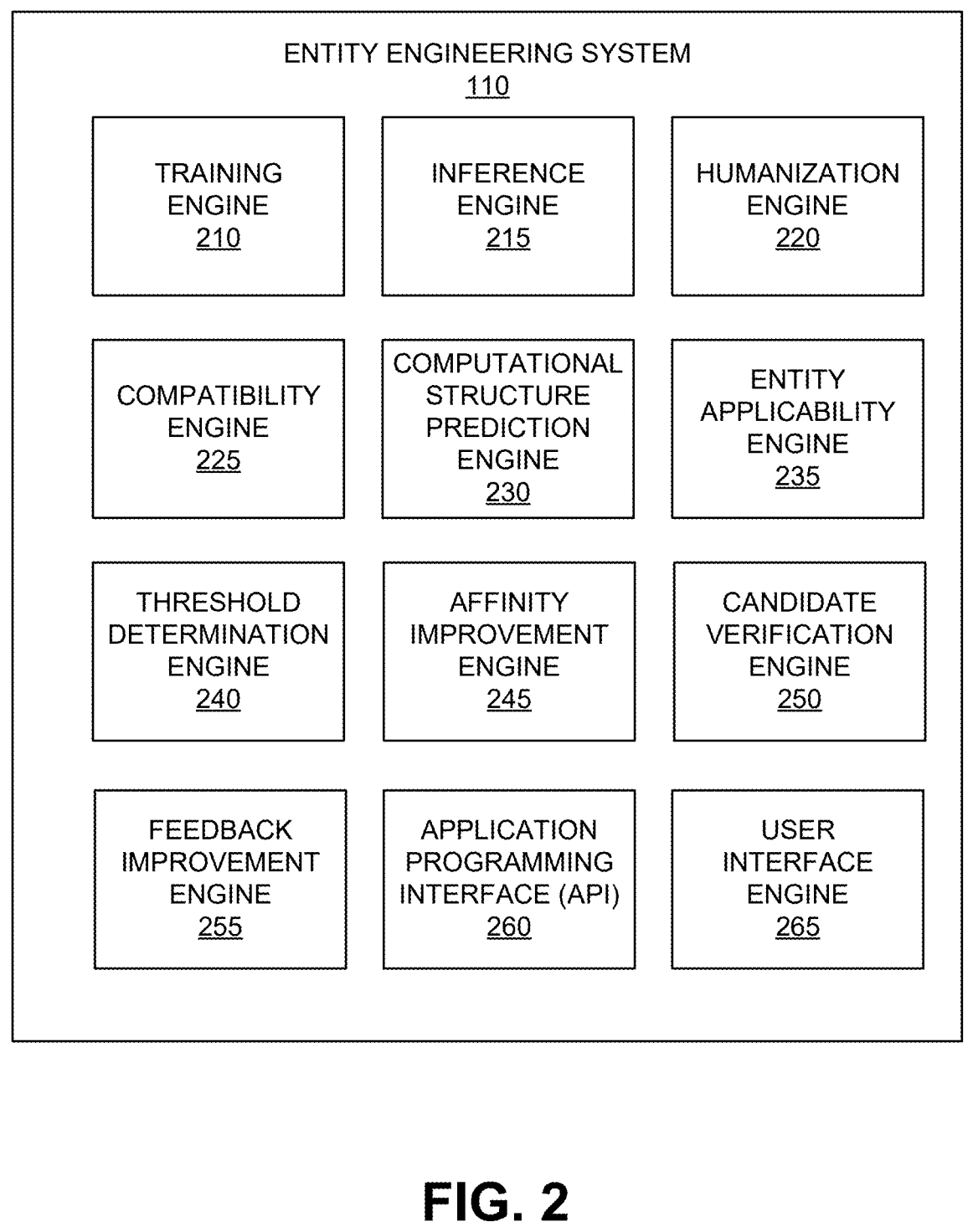

ENTITY ENGINEERING SYSTEM
110

TRAINING
ENGINE
210

INFERENCE
ENGINE
215

HUMANIZATION
ENGINE
220

COMPATIBILITY
ENGINE
225

COMPUTATIONAL
STRUCTURE
PREDICTION
ENGINE
230

ENTITY
APPLICABILITY
ENGINE
235

THRESHOLD
DETERMINATION
ENGINE
240

AFFINITY
IMPROVEMENT
ENGINE
245

CANDIDATE
VERIFICATION
ENGINE
250

FEEDBACK
IMPROVEMENT
ENGINE
255

APPLICATION
PROGRAMMING
INTERFACE (API)
260

USER
INTERFACE
ENGINE
265

FIG. 2

INITIAL
SEQUENCE
SELECTION
310

SEQUENCE
HUMANIZATION
320

CONTACT
RESIDUE
IDENTIFICATION
330

AFFINITY
MATURATION
340

ADDITIONAL
ENGINEERING
AND SELECTION
350

FEEDBACK
370

LABORATORY
TESTING 360

300

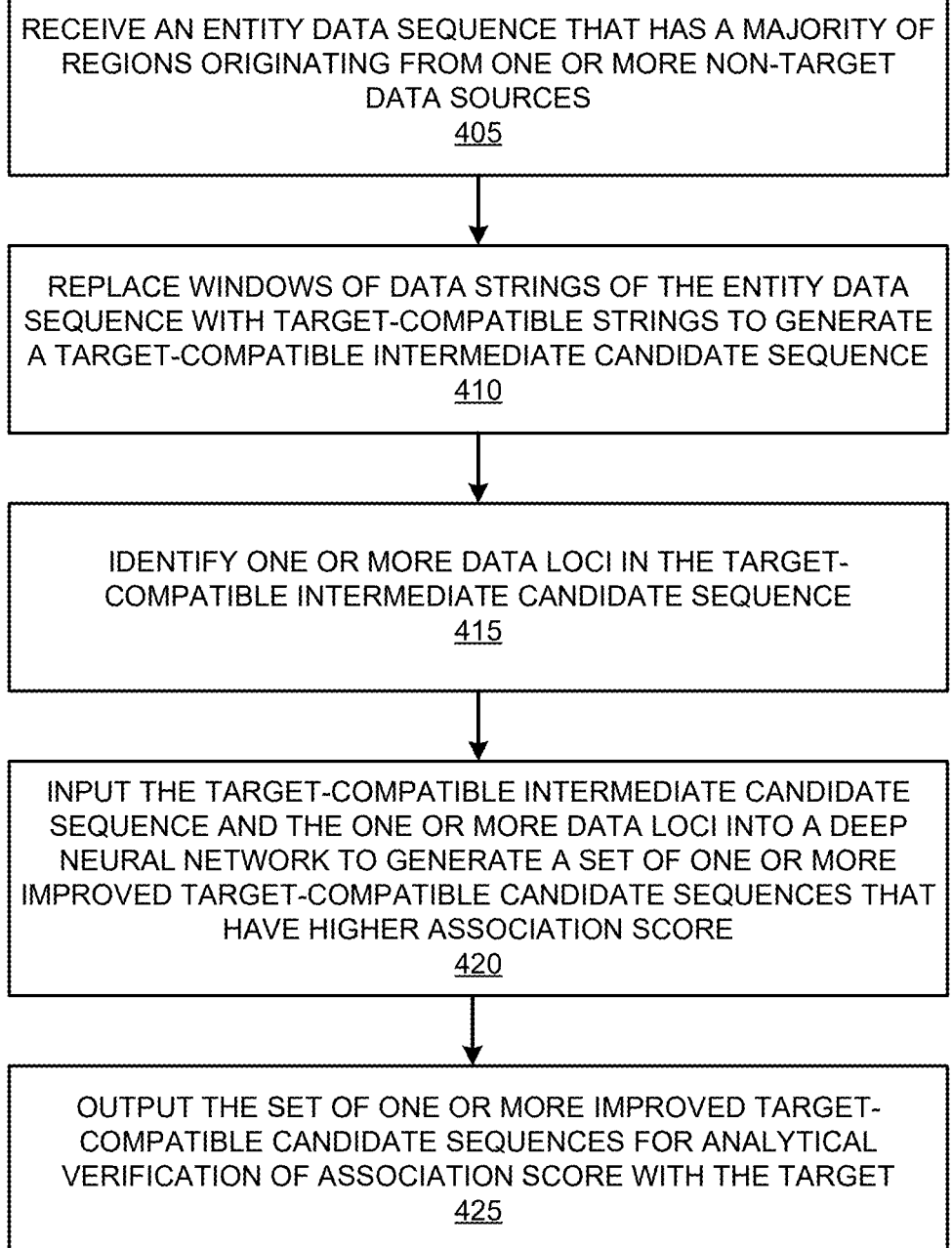

RECEIVE AN ENTITY DATA SEQUENCE THAT HAS A MAJORITY OF REGIONS ORIGINATING FROM ONE OR MORE NON-TARGET DATA SOURCES
405

REPLACE WINDOWS OF DATA STRINGS OF THE ENTITY DATA SEQUENCE WITH TARGET-COMPATIBLE STRINGS TO GENERATE A TARGET-COMPATIBLE INTERMEDIATE CANDIDATE SEQUENCE
410

IDENTIFY ONE OR MORE DATA LOCI IN THE TARGET-COMPATIBLE INTERMEDIATE CANDIDATE SEQUENCE
415

INPUT THE TARGET-COMPATIBLE INTERMEDIATE CANDIDATE SEQUENCE AND THE ONE OR MORE DATA LOCI INTO A DEEP NEURAL NETWORK TO GENERATE A SET OF ONE OR MORE IMPROVED TARGET-COMPATIBLE CANDIDATE SEQUENCES THAT HAVE HIGHER ASSOCIATION SCORE
420

OUTPUT THE SET OF ONE OR MORE IMPROVED TARGET-COMPATIBLE CANDIDATE SEQUENCES FOR ANALYTICAL VERIFICATION OF ASSOCIATION SCORE WITH THE TARGET
425

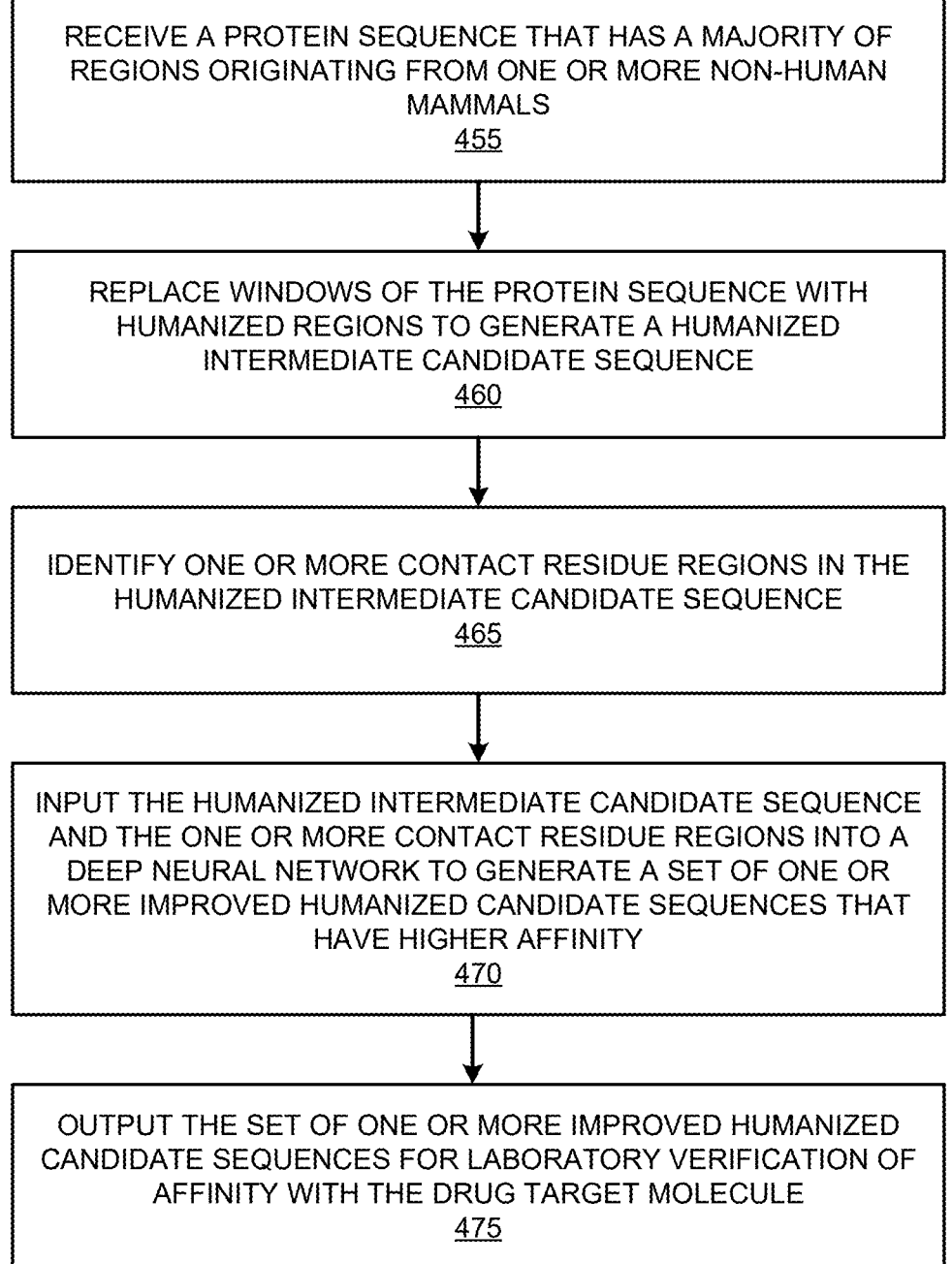

RECEIVE A PROTEIN SEQUENCE THAT HAS A MAJORITY OF
REGIONS ORIGINATING FROM ONE OR MORE NON-HUMAN
MAMMALS
455

REPLACE WINDOWS OF THE PROTEIN SEQUENCE WITH
HUMANIZED REGIONS TO GENERATE A HUMANIZED
INTERMEDIATE CANDIDATE SEQUENCE
460

IDENTIFY ONE OR MORE CONTACT RESIDUE REGIONS IN THE
HUMANIZED INTERMEDIATE CANDIDATE SEQUENCE
465

INPUT THE HUMANIZED INTERMEDIATE CANDIDATE SEQUENCE
AND THE ONE OR MORE CONTACT RESIDUE REGIONS INTO A
DEEP NEURAL NETWORK TO GENERATE A SET OF ONE OR
MORE IMPROVED HUMANIZED CANDIDATE SEQUENCES THAT
HAVE HIGHER AFFINITY
470

OUTPUT THE SET OF ONE OR MORE IMPROVED HUMANIZED
CANDIDATE SEQUENCES FOR LABORATORY VERIFICATION OF
AFFINITY WITH THE DRUG TARGET MOLECULE
475

AI-ACCELERATED DATA SEQUENCE ENGINEERING SYSTEM

TECHNICAL FIELD

The instant disclosure is related to an artificial intelligence system and more specifically to an artificial intelligence system that performs data sequence engineering.

BACKGROUND

Optimizing data sequences for compatibility with specific targets presents significant challenges across various domains. Data sequences originating from non-target sources often contain structural or functional characteristics that may not align with the desired application, necessitating modifications to improve their suitability. Traditional methods for sequence optimization rely on manual curation, heuristic-based modifications, or rule-based approaches, which can be time-intensive, labor-intensive, and prone to inconsistencies. Additionally, ensuring that modifications retain critical functional properties while enhancing compatibility remains a complex task, as changes to one region of a sequence may inadvertently disrupt overall structure or performance.

Machine learning techniques have emerged as potential solutions for optimizing data sequences, but existing models often lack transparency in their decision-making processes, making them difficult to interpret and fine-tune for specific applications. The black-box nature of many AI-driven approaches limits the ability to precisely control outputs, leading to challenges in optimizing sequences while maintaining critical functional and structural constraints. Furthermore, many current approaches fail to efficiently integrate structural and functional assessments, leading to suboptimal modifications that require extensive experimental validation.

BRIEF DESCRIPTION OF THE DRAWINGS

FIG.

FIG. 2 is a block diagram illustrating an example entity engineering system, in accordance with some embodiments.

FIG. 4A is a flowchart depicting an entity engineering process, in accordance with some embodiments.

FIG. 4B is a flowchart depicting a protein engineering process, in accordance with some embodiments.

The figures depict, and the detailed description describes, various non-limiting embodiments for purposes of illustration only.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
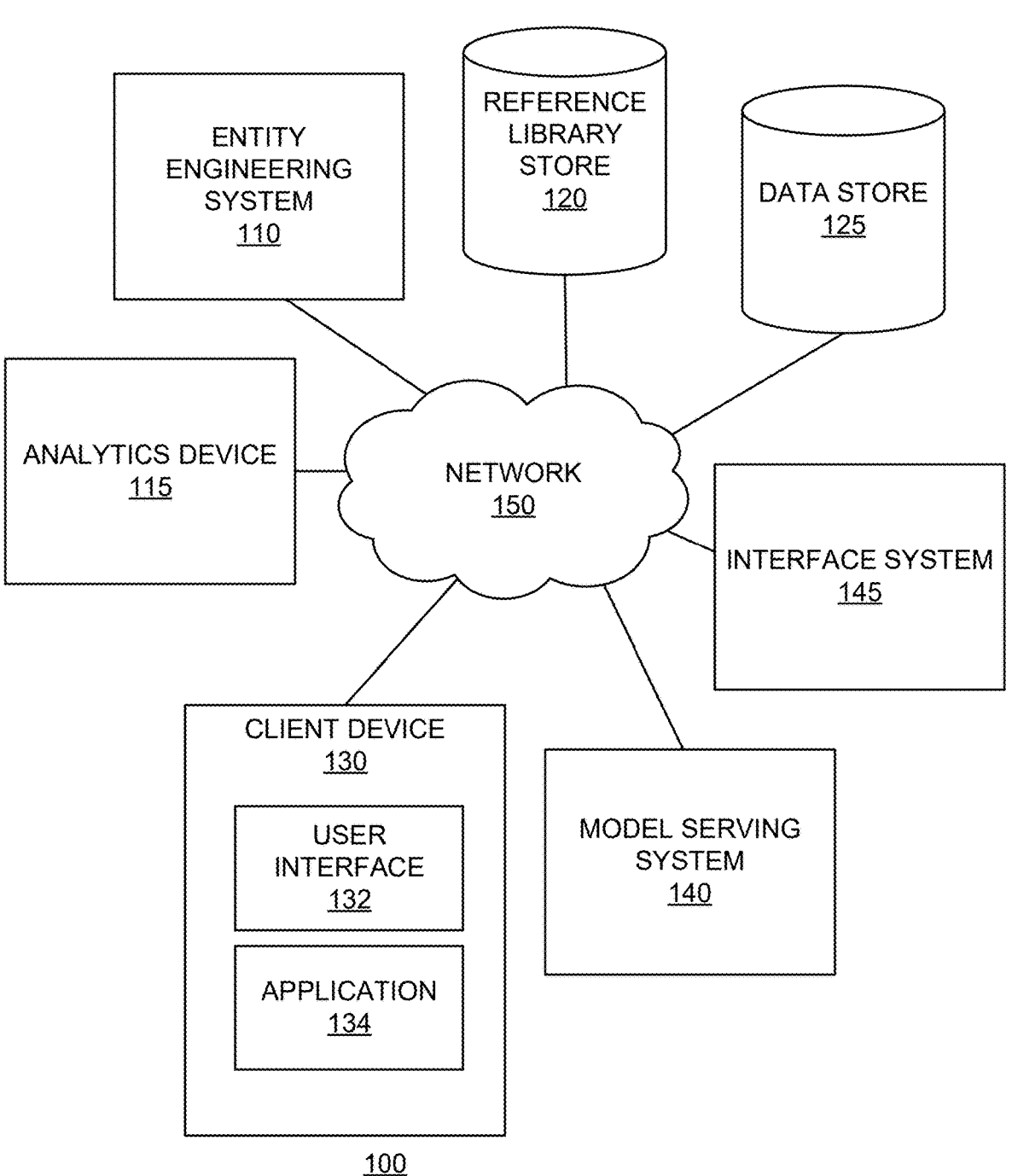
(FIG. 1 is a block diagram of a system environment, in accordance with some embodiments.

FIG. 1 is a block diagram that illustrates an example of a computing environment 100 for engineering entities, in accordance with some embodiments. By way of example, the computing environment 100 includes components that may be computing systems such as an entity engineering system 110, an analytics device 115, a reference library store 120, a data store 125, a client device 130, a model serving system 140, and an interface system 145. The entities and components in the computing environment 100 may communicate with each other through network 150. In various embodiments, the computing environment 100 may include different, fewer, or additional components. Further, the components of the computing systems in the computing environment 100 may be configured as computing devices that may include some or all of the components of the example computing machine described with FIG. 8. Each of the computing devices of the computing environment 100 that may be structured to operate for specific purposes as further described herein.

The components in the computing environment 100 may each correspond to a separate and independent entity or may be controlled by the same entity. For example, in some embodiments, the entity engineering system 110 may control the data store 125. In other embodiments, the entity engineering system 110 and the data store 125 are operated by different entities and the data store 125 provides data storage service to the entity engineering system 110. Likewise, in some embodiments, the entity engineering system 110 may control the model serving system 140. In some embodiments, the model serving system 140 may be a third party that provides pre-trained models for the entity engineering system 110 to use or fine-tune.

While a component in the computing environment 100 is sometimes described in disclosure in a singular form, the computing environment 100 may include one or more of the component. For example, there can be multiple client devices 130 communicating with the entity engineering system 110 in engineering various entities. As such, while a component may be described in this disclosure in a singular form, it should be understood that in various embodiments, the component may have multiple instances. Likewise, while some of the components are described in a plural form, in some embodiments the component only has a single instance in the computing environment 100.

In some embodiments, the entity engineering system 110 includes components and machine learning models for facilitating AI-assisted discovery and engineering of entities. Entities may refer to amino-acid based therapeutic entities, such as antibody sequences, proteins, peptides, fusion proteins, antibody-drug conjugates, and other amino-acid based therapeutic entities. The entity engineering system 110 may receive input sequences of entities and apply computational models to generate modified sequences that exhibit improved characteristics, such as humanization, enhanced affinity, reduced immunogenicity, and improved stability. The entity engineering system 110 may integrate multiple AI-driven methodologies, including deep learning, reinforcement learning, and sequence-to-structure predictive modeling, to assess and modify molecular sequences. The entity engineering system 110 may further incorporate sequence comparison algorithms that leverage a reference library store 120 to identify homologous sequences within known human frameworks or other predefined sequence databases. In some embodiments, the entity engineering system 110 may generate variant sequences by applying mutational strategies to parent sequences, followed by in silico and/or laboratory validation steps to predict the sequences' binding properties. The entity engineering system 110 may also interface with one or more analytics devices 115 to facilitate experimental validation of the generated sequences for synthesis and laboratory testing. The entity engineering system 110 may further interact with the data store 125 to store computational results, training datasets, and intermediate sequence modifications, enabling iterative refinement of generated sequences.

In some embodiments, the entity engineering system 110 may be implemented as a distributed computing system utilizing cloud-based infrastructure or high-performance computing clusters to handle complex modeling tasks. The entity engineering system 110 may employ generative AI models trained on large-scale biological sequence data, structural datasets, and experimental affinity measurements to generate optimized sequences. The entity engineering system 110 may be configurable to operate in different modes, including sequence generation, sequence optimization, and de novo design to allow flexible adaptation to various drug discovery applications. Additionally, the entity engineering system 110 may integrate external sequence databases, such as publicly available genomic libraries or proprietary datasets, to enhance the diversity of sequence designs. The entity engineering system 110 may include customizable pipelines that allow researchers to specify design constraints, such as sequence similarity thresholds, physicochemical properties, or manufacturability criteria. In some implementations, the entity engineering system 110 may provide a user interface accessible via client device 130 to allow users to interact with generated sequences, adjust design parameters, and review computational analyses.

In some embodiments, the entity engineering system 110 may provide AI-assisted engineering tools for various amino-acid based therapeutic entities, although antibodies are used as main examples in this disclosure. For peptide-based therapeutics, the entity engineering system 110 may apply sequence-based generative models to identify modifications that enhance humanization, affinity, stability, bioavailability, or receptor specificity.

In various embodiments, the entity engineering system 110 may take different suitable forms. For example, while the entity engineering system 110 is described in a singular form, the entity engineering system 110 may include one or more computers that operate independently, cooperatively, and/or distributively. In some embodiments, the entity engineering system 110 may be a server computer that includes one or more processors and memory that stores code instructions that are executed by one or more processors to perform various processes described herein. In some embodiments, the entity engineering system 110 may also be referred to as a computing device or a computing server. In some embodiments, the entity engineering system 110 may be a pool of computing devices that may be located at the same geographical location (e.g., a server room) or be distributed geographically (e.g., cloud computing, distributed computing, or in a virtual server network). In some embodiments, the entity engineering system 110 may be a collection of servers that independently, cooperatively, and/or distributively provide various products and services described in this disclosure. The entity engineering system 110 may also include one or more virtualization instances such as a container, a virtual machine, a virtual private server, a virtual kernel, or another suitable virtualization instance. In some embodiments, the entity engineering system 110 may provide client devices 130 with various engineering tools and machine learning models as a form of cloud-based software, such as software as a service (SaaS) through the network 150. In some situations, the entity engineering system 110 may also refer to the entity that operates the entity engineering system 110.

In some embodiments, analytics devices 115 may perform experimental studies and validation of entities generated by the entity engineering system 110. The analytics devices 115 may include laboratory instrumentation and assay platforms designed to assess molecular properties, structural characteristics, and functional interactions of generated sequences. For example, an analytics device 115 may receive entity candidates and conduct affinity measurement experiments to evaluate the binding interactions with target molecules. The analytics devices 115 may utilize techniques such as bio-layer interferometry (BLI) and surface plasmon resonance (SPR) to quantify real-time binding kinetics, isothermal titration calorimetry (ITC) to measure thermodynamic parameters of molecular interactions, and deep mutational scanning (DMS) to systematically evaluate the impact of amino acid substitutions on protein function. In some embodiments, the analytics devices 115 may identify key contact residues within the molecular interface by performing structural analysis through X-ray crystallography, nuclear magnetic resonance (NMR) spectroscopy, or cryo-electron microscopy (cryo-EM), while computational structural modeling tools may be employed to predict and refine three-dimensional conformations of designed proteins. The analytics devices 115 may further assess the stability, solubility, and aggregation propensity of generated sequences using biophysical characterization techniques such as differential scanning calorimetry (DSC) or dynamic light scattering (DLS). The experimental data may be fed back into the entity engineering system 110 to refine computational models. In some embodiments, the analytics devices 115 may also include cell-based assay systems for evaluating functional activity, such as reporter gene assays, proliferation assays, cytotoxicity assays, and pseudo-virus neutralization assays for evaluating the efficacy of antibody candidates against viral targets.

In some embodiments, for antibody humanization and affinity engineering, the analytics devices 115 may include structural analysis tools, high-resolution imaging systems, and biophysical assay platforms to determine key contact residue regions in a candidate antibody. Various techniques may be used, including X-ray crystallography, nuclear magnetic resonance (NMR) spectroscopy, cryo-electron microscopy (cryo-EM), and hydrogen-deuterium exchange mass spectrometry (HDX-MS) to resolve structural details and identify critical interactions within the antibody-antigen complex. In some embodiments, computational docking studies combined with site-directed mutagenesis and deep mutational scanning may be employed to validate the contribution of specific residues to binding affinity and stability. The analytics devices 115 may also utilize biolayer interferometry (BLI) and surface plasmon resonance (SPR) to assess real-time binding kinetics and elucidate the functional importance of contact residues. In some embodiments, biolayer interferometry (BLI) and antibody sequence likelihood scoring models may be employed to predict affinity-matured variants before experimental validation. Polyspecificity assays may be further utilized to assess off-target interactions and minimize undesirable cross-reactivity of engineered antibodies. For certain peptide-based therapeutics, analytics devices 115 may assess peptide-receptor interactions, proteolytic stability, and structural conformations using spectroscopy-based techniques and computational structural modeling approaches.

In some embodiments, the reference library store 120 may include one or more reference libraries that store sequence data, genomic data, structural information, and molecular interaction profiles used by the entity engineering system 110 to design and optimize therapeutic entities. The reference library store 120 may include curated databases containing known human antibody frameworks, protein structures, genomic sequences, and molecular binding data. The reference library store 120 may facilitate sequence alignment, homology modeling, and structural predictions by providing a repository of reference sequences that may be utilized to guide AI-assisted modifications. In some implementations, the reference library store 120 may store metadata associated with sequence modifications and data for lineage tracking of parental sequences and derived variants. The reference library store 120 may further integrate with the entity engineering system 110 to provide access to updated reference data.

In some embodiments, the reference library store 120 may support multiple types of molecular data, including small molecules, peptides, nucleic acids, lipids, and engineered proteins. The reference library store 120 may be structured as a relational or graph-based database for querying of sequence similarity, structural motifs, or known functional annotations. The reference library store 120 may include antibody sequence repositories containing variable domain frameworks, complementarity-determining regions (CDRs), and epitope-paratope interaction data for guiding antibody humanization and affinity maturation. The reference library store 120 may also include databases of natural and synthetic peptides, structure-function relationships, and post-translational modification data.

The reference library store 120 may also contain structural libraries of small-molecule-protein complexes, such as chemical libraries with known bioactivity profiles, metabolic stability data, and physicochemical properties. Additionally, the reference library store 120 may store annotated RNA sequence libraries, including non-coding RNA elements, siRNA, mRNA therapeutics, and secondary structure predictions. The reference library store 120 may store genomic sequences, RNA secondary structure motifs, and CRISPR guide RNA libraries for gene-editing applications. The reference library store 120 may further contain lipid structural data, including lipid nanoparticle formulations and lipid-protein interactions, supporting the development of lipid-based drug delivery systems.

The reference library store 120 may include publicly available databases, proprietary datasets, or hybrid collections combining multiple sources. Publicly available databases may include sequence repositories such as GenBank, the Universal Protein Resource (UniProt), and the Protein Data Bank (PDB), which provide genetic, protein, and structural information for molecular design and optimization. For antibody engineering, the reference library store 120 may incorporate datasets such as the Observed Antibody Space (OAS), which contains antibody sequences derived from human and animal immune repertoires, and the Structural Antibody Database (SAbDab), which includes curated antibody-antigen complex structures. Small molecule-related datasets may include the ChEMBL bioactivity database, PubChem for chemical compounds, and the ZINC database for virtual screening of drug-like molecules. For nucleic acid-based therapeutics, the reference library store 120 may integrate datasets such as RNAcentral, which compiles non-coding RNA sequences, and miRBase, a repository for microRNA sequences. Lipid-based datasets may include data from LipidMaps, which provides structural and functional lipid annotations, and Nanoparticle Information Library (NIL), which contains data on lipid nanoparticles and their interactions.

Proprietary datasets may be constructed by compiling experimental results from internal research, proprietary sequence collections, or custom annotations of molecular interactions derived from in-house computational modeling and high-throughput screening campaigns. For example, the outputs of entity engineering system 110 may be used for laboratory validation and the experimental data may be used stored as proprietary datasets used for training of one or more models used by the entity engineering system 110. Proprietary datasets may also include custom-designed antibody sequence libraries optimized for humanization and affinity maturation, structure-activity relationship (SAR) datasets for small molecules generated through in-house medicinal chemistry efforts, and lipid formulation libraries developed for optimizing drug delivery systems. Proprietary datasets may also include sequence modifications derived from AI-assisted generative models, predictive modeling outputs for RNA stability and secondary structures, and proprietary annotations of post-translational modifications affecting protein therapeutics. Hybrid collections may integrate both public and proprietary data. For example, the reference library store 120 may use publicly available knowledge while incorporating proprietary and domain-specific data to enhance AI-driven drug discovery pipelines.

The computing environment 100 may include various data stores 125 that store different types of data for different entities. For example, the entity engineering system 110 may store weights of trained models in a data store 125. The entity engineering system 110 may also store, in a data store 125, various physical and chemical parameters of entities, including molecular weight, solubility, stability, binding affinity, dissociation constants, isoelectric points, hydrophobicity, and secondary and tertiary structural information. The entity engineering system 110 may also store experimental assay results, including kinetic and thermodynamic binding measurements, cellular activity data, immunogenicity assessments, and toxicity profiles. Additionally, the entity engineering system 110 may store metadata associated with sequence optimization, including mutational lineage data, computational predictions of structure-function relationships, and iterative modifications generated through AI-assisted modeling. The data store 125 may further include datasets of molecular interactions, drug metabolism and pharmacokinetics (DMPK) profiles, and formulation parameters for therapeutic delivery systems.

A data store 125 includes one or more data storage units, such as a solid state memory, disk drive, or optical drive, that take the form of a non-transitory and non-volatile computer storage medium to store various data. The computer-readable storage medium is a medium that does not include a transitory medium, such as a propagating signal or a carrier wave. In one embodiment, the data store 125 communicates with other components by the network 150. This type of data store 125 may be referred to as a cloud storage server. Examples of cloud storage service providers may include AMAZON AWS, DROPBOX, RACKSPACE CLOUD FILES, AZURE, GOOGLE CLOUD STORAGE, etc. In some embodiments, instead of a cloud storage server, a data store 125 may be a storage device that is controlled and connected to the entity engineering system 110. For example, the data store 125 may take the form of memory (e.g., hard drives, flash memory, discs, ROMs, etc.) used by the entity engineering system 110, such as storage devices in a storage server room that is operated by the entity engineering system 110.

A client device 130 may also be referred to as a user device. A client device 130 may be controlled by an end user of the entity engineering system 110. The client device 130 may be any computing device. Examples of client devices 130 include personal computers (PC), desktop computers, laptop computers, tablet computers, smartphones, wearable electronic devices such as smartwatches, or any other suitable electronic devices.

A client device 130 may include a user interface 132 and an application 134. The user interface 132 may be the interface of the application 134 and allow the user to perform various actions associated with application 134. For example, application 134 may be a software application, and the user interface 132 may be the front end. The user interface 132 may take different forms. In some embodiments, the user interface 132 is a graphical user interface (GUI) of a software application. For example, the entity engineering system 110 may provide simulation software that can display various engineered entities. In some embodiments, the front-end software application is a software application that can be downloaded and installed on a client device 130 via, for example, an application store (App store) of the client device 130. In some embodiments, the front-end software application takes the form of a webpage interface that allows users to perform actions through web browsers. A front-end software application includes a GUI that displays various information and graphical elements. In some embodiments, the GUI may be the web interface of a software-as-a-service (SaaS) platform that is rendered by a web browser. In some embodiments, user interface 132 does not include graphical elements but communicates with a server or a node via other suitable ways, such as command windows or application program interfaces (APIs).

In computing environment 100, the entity engineering system 110 may operate one or more applications 134 that interact with client devices 130. The application 134 may be hosted on the cloud computing environment and controlled by the entity engineering system 110 or may be installed on a client device 130. In various embodiments, the entity engineering system 110 operates different types of applications 134, including a drug discovery tool that facilitates AI-assisted molecular design, an antibody humanization tool that generates optimized humanized sequences, a sequence analysis tool that evaluates molecular stability and binding affinity, and a structural modeling tool that predicts three-dimensional conformations of candidate therapeutic entities. The entity engineering system 110 may also operate an optimization platform for refining drug candidates based on experimental feedback, a virtual screening tool for ranking molecular candidates based on predicted binding interactions, and a workflow management system that integrates computational modeling with laboratory validation processes. These are merely examples of various types of applications 134 that may be operated on a client device 130. In some embodiments, functionalities of those tools may be combined as a single application 134, enabling a unified interface for sequence design, optimization, validation, and data visualization.

A model serving system 140 is a system that provides machine learning models. The model serving system 140 may be controlled by the entity engineering system 110 or by a third party, such as a frontier model research lab or provider. The model serving system 140 may receive requests from the entity engineering system 110 to perform tasks using machine learning models. The tasks may include, but are not limited to, data sequence engineering (e.g., data sequence engineering), structure prediction, molecular docking simulations, natural language processing (NLP) tasks, property prediction (e.g., binding affinity estimation, immunogenicity prediction, or solubility assessment), generative model-based sequence design, and multimodal data integration for optimizing therapeutic entities. In some embodiments, one or more machine learning models deployed by the model serving system 140 are models originally trained to perform one or more NLP tasks but are fine-tuned for entity engineering tasks. The NLP tasks include, but are not limited to, text generation, query processing, machine translation, chatbots, and the like. The fine-tuned tasks may or may not be language-related. For example, in some embodiments, one or more models are trained to perform tasks that are related to therapeutics entities, such as sequence generation for antibody humanization, structural prediction of biomolecules, optimization of binding interactions, identification of functional motifs within protein or nucleic acid sequences, molecular property prediction, de novo drug design using generative models, and multi-omics data analysis for target discovery. Various machine learning models discussed in this disclosure may be provided by the model serving system 140 or the entity engineering system 110, depending on the location of hosting of the particular model.

The model serving system 140 may receive a request including input data (e.g., sequence data of an entity) and encode the input data into one or more input tokens. The model serving system 140 may apply a machine learning model to generate a set of output tokens. Each token in the set of input tokens or the set of output tokens may correspond to a sequence element in an entity. For example, a token may correspond to a sequence element, which may be encoded from an atom, a functional group, an amino acid, a nucleotide, a covalent bond, an ionic bond, a non-covalent interaction, and another force, a molecular substructure, a residue, a chemical motif, a stereochemical configuration, a molecular fragment, a polymeric repeat unit, a conformational state, a physicochemical property, an interaction site, or a structural domain. In some embodiments, the model may be a language model but is trained to tokenize an entity. The language model may receive a sequence of one or more input tokens that represent a query of an entity and generate a sequence of output tokens that represent a predicted physical structure of the queried entity. In some embodiments, the model predicts the next token in an entity in an autoregressive manner. In some embodiments, the model generates an entity through diffusion.

In some embodiments, the sequence of input tokens or output tokens is arranged as a tensor with one or more dimensions, for example, one dimension, two dimensions, or three dimensions. For example, one dimension of the tensor may represent the number of tokens (e.g., length of a sequence), one dimension of the tensor may represent sequence elements, one dimension of the sensor may represent parameters corresponding to the sequence elements, and one dimension of the tensor may represent a space in an embedding space. The input data or the output data may be configured as any number of appropriate dimensions depending on the entities. In some embodiments, one or more dimensions are latent features learned in the deep layers of a machine learning model and do not correspond individually to a real-world concept.

The machine learning models served by the model serving system 140 may take different model structures. In some embodiments, one or more models are configured to have a transformer neural network architecture. Specifically, the transformer model is coupled to receive sequential data tokenized into a sequence of input tokens and generates a sequence of output tokens depending on the task to be performed. Transformer models are examples of language models that may or may not be auto-regressive. In some embodiments, the language models may have the architecture of a language model but are trained or re-trained to perform simulations of entities.

In some embodiments, the language models are large language models (LLMs) that are trained on a large corpus of training data to generate outputs. An LLM may be trained on massive amounts of training data, often involving billions of words or text units, and may be fine-tuned by training data of molecular conformations. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has a significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the model serving system 140. In some embodiments, the LLM may also be fine-tuned by the model serving system 140 or by the entity engineering system 110. An LLM may be trained on a large amount of data from various data sources. For example, the data sources include websites, articles, posts on the web, and the like. From this massive amount of data coupled with the computing power of LLM, the LLM is able to perform various tasks and synthesize and formulate output responses based on information extracted from the training data.

In some embodiments, when the machine learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While an LLM with specific layer architecture is described as an example in this disclosure, the language model can be configured as any other appropriate architecture including, but not limited to, long short-term memory (LSTM) networks, Markov networks, Bidirectional Encoder Representations from Transformers (BERT), generative-adversarial networks (GAN), diffusion models (e.g., Diffusion-LM), recurrent neural networks (RNN), gated recurrent units (GRU), transformer-based architectures (e.g., GPT, T5, BART), graph neural networks (GNN), linear recurrent neural networks (RNN) such as Mamba, sequence-to-sequence (Seq2Seq) models, mixture of experts (MoE) models, and protein structure prediction models such as AlphaFold, RoseTTAFold, and ESMFold, which leverage attention mechanisms and geometric deep learning to model biomolecular structures.

In various embodiments, the model serving system 140 may or may not be operated by the entity engineering system 110. In some embodiments, the model serving system 140 is a sub-server or a sub-module of the entity engineering system 110 for hosting one or more machine learning models. In such cases, the entity engineering system 110 is considered to be hosting and operating one or more machine learning models. In some embodiments, a model serving system 140 is operated by a third party such as a model developer that provides access to one or more models through API access for inference and fine-tuning. For example, the model serving system 140 may be provided by a frontier model developer that trains a large language model that is available for the entity engineering system 110 to be fine-tuned to be used in the context of simulating entities.

In some embodiments, the task for the model serving system 140 may be based on knowledge of the entity engineering system 110 that is fed to the machine learning model of the model serving system 140, rather than relying on general knowledge encoded in the model weights of the model. Thus, one objective may be to perform various types of engineering tasks based on external data such as experimental data and laboratory measurements in order to alter data sequences. The external data may also be a library of candidate amino acid sequences with corresponding data that are used in screening in sequencing engineering and discovery. The retrieval of external data may include any suitable techniques, such as retrieval-augmented generation (RAG), vector-based similarity search, knowledge graph retrieval, database query optimization, active learning frameworks that prioritize high-value data points, fine-tuning with external datasets, reinforcement learning with experimental feedback, hybrid retrieval methods combining semantic and structural similarity searches, indexing methods for structured and unstructured biological data, and multi-modal data fusion to integrate heterogeneous sources of molecular information.

In some embodiments, the entity engineering system 110 may be connected to an interface system 145. The interface system 145 receives external data from the entity engineering system 110 and builds a structured index over the external data using, for example, another machine-learned language model or heuristics. The interface system 145 receives one or more queries from the entity engineering system 110 on the external data. Using the structured index over the external data, the interface system 145 obtains one or more responses from the model serving system 140 and synthesizes a response to the query on the external data. While the entity engineering system 110 can directly generate a prompt using the external data as context, sometimes the amount of information in the external data exceeds token limitations allowed by the machine-learned language model. The interface system 145 can resolve token limitations by generating a structured index of the external data and offering data connectors to external data sources.

The communications among the entity engineering system 110, an analytics device 115, a reference library store 120, a data store 125, a client device 130, a model serving system 140, and an interface system 145 may be transmitted via a network 150. In some situations, a network 150 may be a local network. In some situations, a network 150 may be a public network such as the Internet. In one embodiment, the network 150 uses standard communications technologies and/or protocols. Thus, the network 150 may include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 150 may include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 150 may be represented using technologies and/or formats, including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network 150 also includes links and packet-switching networks such as the Internet.

Central Simulation System

FIG. 2 is a block diagram illustrating an example entity engineering system 110, in accordance with some embodiments. In some embodiments, an entity engineering system 110 may include a training engine 210, an inference engine 215, a humanization engine 220, a compatibility engine 225, a computational structure prediction engine 230, an entity applicability engine 235, a threshold determination engine 240, an affinity improve engine 245, a candidate verification engine 250, a feedback improvement engine 255, an application programming interface (API) 260, a user interface engine 265. The engines may be configured as special purpose processing system configured to execute functionality as further describe herein. In various embodiments, the entity engineering system 110 may include additional, fewer, or different components. The functionalities described in various components may also be distributed in a different manner among the components.

A training engine 210 may manage the training and re-training of one or more machine learning models used for engineering of entities. The training engine 210 may determine model architecture, select training sets, and define training objectives. The training engine 210 may also define the end condition in training, such as by setting the number of epochs or a convergence criterion to determine an end point of the training. In some embodiments, the training engine 210 may also fine-tune domain-specific and/or objective-specific models that are fine-tuned for clients. For example, one client of the entity engineering system 110 may be in the study of protein-small-molecule interaction. The training engine 210 may use a set of small molecule training samples to fine-tune a first machine learning model. In another instance, another client of the entity engineering system 110 may perform humanization of antibody. The training engine 210 may use a set of antibody library as training samples to fine-tune a second machine learning model. Further details of various training techniques is discussed in association with FIG. 7.

The training engine 210 may determine the model architecture. In some embodiments, the machine learning models for engineering entities may use the architecture of a language model, such as a transformer model. Additionally, or alternatively, the machine learning model may include the architecture with attention mechanisms. While a transformer model includes the attention mechanism, some other model architecture that is attention-based may also be used. Additionally, or alternatively, the machine learning model may be token-based and auto-regressive. For example, a decoder-based transformer model may be used to predict the next token in an auto-regressive manner. Additionally, or alternatively, certain parts of the machine learning model are bi-directional such as in an encoder portion. In some embodiments, the machine learning model is a decoder-only model. In some embodiments, the machine learning model may take the form of a diffusion model. In various embodiments, depending on the model type and architecture, the machine learning model may be referred to as a language model, a transformer model, an attention-based model, a token-based model, an auto-regressive model, a diffusion-based model, a recurrent model, a graph-based model, a sequence-to-sequence model, a mixture of experts (MoE) model, a geometric deep learning model, a protein structure prediction model, a retrieval-augmented model, a latent variable model, or any combination of these models.

In some embodiments, the training engine 210 may determine how training and re-training are performed. For example, the machine learning model may be trained using training samples related to entities. In some embodiments, the transformer model may first be trained as a language model using textual training samples and be re-trained by training samples that model entities. Re-training may include further training of a machine learning model, such as in epochs subsequent to the initial epoch that is considered as the initial training. Re-training may also include re-training in a trained model, such as in further training that is performed in response to additional data being generated. Re-training may also include fine-tuning a pre-trained model. The pre-trained model may be a language model that is trained by textual training data or a model that is trained by entity data. In some cases, fine-tuning may also be considered as part of transfer training. For example, fine-tuning allows a language model to be trained as a simulation model with a relatively smaller set of training data related to entities. In some embodiments, fine-tuning may also be performed to further tailor an entity-engineering model to a particular downstream application. For example, antibody training samples may be used to fine-tune a trained simulation model to specialize in predicting antibody affinities.

An inference engine 215 may manage a trained machine learning model to perform various therapeutics entity-engineering tasks, such as sequence optimization for antibody humanization, molecular property prediction (e.g., binding affinity, solubility, stability), de novo sequence generation, protein structure prediction, small-molecule docking simulations, mutational effect prediction, functional motif identification, and multi-modal data integration for drug discovery and candidate ranking. For example, a client may provide the entity engineering system 110 with an amino acid sequence for the machine learning model to generate a simulation of a set of physical structures of the peptide given certain physical conditions such as temperature, pressure, and solvent. In some embodiments, the inference engine 215 may select one of the fine-tuned models to perform a client-specific task. For example, a client may perform one or more drug discovery tasks that are related to generating a de novo amino-acid sequence that is predicted to bind to a target molecule. The inference engine 215 may select a model that specializes in generating a chemical formula or structure of a new molecule. In another example, the inference engine 215 may select a model that engineers the sequence of an antibody to improve humanization and affinity to a target.

In some embodiments, the humanization engine 220 may facilitate the conversion of non-human sequences (e.g., antibody sequences) into humanized sequences that retain binding specificity while minimizing immunogenicity. Example sequences that may be humanized may include antibody sequences, single-domain antibodies, nanobody sequences, antibody fragments such as Fab and scFv, T-cell receptor sequences, and other protein-based therapeutic constructs that require humanization to reduce immunogenicity while maintaining functional binding properties. The humanization engine 220 may leverage machine learning models, sequence alignment techniques, and structural prediction tools to perform sequence modifications while preserving the functional integrity of the antibody. In some implementations, the humanization engine 220 may first identify a human antibody template by searching a reference library store 120 for sequences that exhibit high similarity to a non-human input sequence. This process may be performed using a lookup-based approach, where the closest human sequence is selected from a pre-existing database, or by employing predictive AI models trained on large datasets of known human and non-human antibodies. Upon identifying a suitable template, the humanization engine 220 may replace non-human residues with human-derived counterparts while ensuring that critical binding residues remain unaltered. This step may involve computational modeling to predict how sequence modifications impact structural stability and antigen binding affinity. The humanization engine 220 may further refine humanized sequences through iterative cycles of mutation and validation to generate candidates that maintain optimal manufacturability and therapeutic efficacy.

In some embodiments, the humanization engine 220 may support multiple methodologies for humanization, accommodating various antibody formats, including monoclonal antibodies, bispecific antibodies, and nanobodies. The humanization engine 220 may process sequences derived from different species, including murine, rabbit, and camelid sources and tailor the humanization process based on species-specific sequence characteristics. In some embodiments, the humanization engine 220 may utilize different types of structural prediction models to assess the impact of sequence modifications. These models may include transformer-based language models that predict humanized sequences based on learned patterns, as well as structure-based AI models, such as AlphaFold or Rosetta, that evaluate the three-dimensional stability of proposed substitutions. The humanization engine 220 may further integrate immunogenicity prediction tools to assess whether humanized sequences contain epitopes that could trigger an immune response. These assessments may guide the selection of alternative substitutions that enhance human compatibility while preserving functionality. The humanization engine 220 may use a structural-based humanization approach and/or a CDR grafting approach, which will be discussed in further detail in FIG. 5A through FIG. 5C.

In some embodiments, the compatibility engine 225 may evaluate the compatibility of a humanized sequence within the human body by predicting the therapeutics entity's immunogenicity, stability, and manufacturability. The compatibility engine 225 may integrate multiple computational models to assess whether a proposed humanized sequence is likely to provoke an immune response, aggregate during production, or exhibit suboptimal pharmacokinetic properties. In some embodiments, the compatibility engine 225 may analyze the sequence for the presence of immunogenic epitopes by comparing the sequence against known human leukocyte antigen (HLA) binding motifs. Machine learning models trained on immunogenicity datasets may predict whether a given sequence contains T-cell epitopes that could trigger an undesirable immune reaction. The compatibility engine 225 may also assess sequence stability using structural modeling tools that predict protein folding and solubility to evaluate whether humanized candidates maintain functional integrity under physiological conditions. In some embodiments, the compatibility engine 225 may incorporate manufacturability prediction tools to evaluate aggregation propensity, glycosylation sites, and expression yield, helping to filter out sequences that may present challenges in large-scale production.

In some embodiments, the compatibility engine 225 may employ various methodologies to improve compatibility predictions based on various antibody formats and therapeutic applications. The compatibility engine 225 may analyze monoclonal antibodies, bispecific antibodies, nanobodies, and other engineered protein constructs to evaluate suitability for therapeutic use. In some implementations, the compatibility engine 225 may use structure-based immunogenicity prediction models, such as neural network classifiers trained on immune response datasets, to refine predictions of potential immune recognition. In some embodiments, the compatibility engine 225 may apply molecular dynamics simulations to model how humanized sequences behave in a physiological environment to identify regions susceptible to unfolding or degradation. The compatibility engine 225 may also leverage databases of clinically validated antibody sequences, such as those from FDA-approved therapeutics, to benchmark humanized candidates against known safe and effective antibodies. In some embodiments, the compatibility engine 225 may incorporate feedback from laboratory testing, such as from one or more analytics devices 115, and update the predictive models of the compatibility engine 225 based on experimental data to improve the accuracy of compatibility assessments.

In some embodiments, the structure prediction engine 230 may generate a three-dimensional structural model of a humanized sequence to evaluate the corresponding entity's stability, folding, and antigen-binding properties. The structure prediction engine 230 may use deep learning models trained on protein structural datasets to infer the spatial conformation of a given sequence. The deep learning models may include transformer-based protein folding algorithms, diffusion models, or physics-based molecular simulations. The structure prediction engine 230 may process a humanized sequence by predicting the backbone conformation, side-chain orientations, and potential post-translational modifications that may influence structural integrity. In some embodiments, the structure prediction engine 230 may use comparative modeling by aligning a humanized sequence with known antibody structures in a reference library store 120 to generate an initial model. This model may then be refined using energy minimization and molecular dynamics simulations to predict an optimized folded conformation. The structure prediction engine 230 may further evaluate the effect of specific mutations introduced during humanization to determine whether key binding residues remain properly positioned for antigen interaction.

In some embodiments, the structure prediction engine 230 may integrate multiple prediction methods to improve accuracy across different antibody formats. The structure prediction engine 230 may utilize machine learning models trained on large antibody structural datasets to predict framework stability and complementarity-determining region (CDR) flexibility. In some embodiments, the structure prediction engine 230 may incorporate physics-based simulations, such as molecular docking techniques, to estimate binding interactions between a humanized antibody and its target antigen. The structure prediction engine 230 may further apply generative AI models to propose alternative structural configurations that may enhance manufacturability and stability while preserving affinity. In some implementations, the structure prediction engine 230 may use experimental structural data, such as crystallographic or cryo-electron microscopy (cryo-EM) models, to validate computational predictions. The structure prediction engine 230 may also support iterative refinement through feedback from affinity testing. In some embodiments, the structure prediction engine 230 may utilize deep learning-based structure prediction models such as AlphaFold to generate protein structure predictions and provide assessments of folding stability and antigen-binding interactions.

In some embodiments, the entity applicability engine 235 may determine the applicability of a humanized sequence or another therapeutic entity in patients by evaluating factors such as antigen compatibility, pharmacokinetics, and expected physiological interactions. The entity applicability engine 235 may analyze whether a proposed antibody sequence is likely to bind effectively to its intended target within the human body while minimizing off-target interactions. In some implementations, the entity applicability engine 235 may incorporate predictive modeling to assess the antibody's biodistribution, clearance rate, and half-life based on known pharmacokinetic and pharmacodynamic parameters. The entity applicability engine 235 may use large-scale patient genomic datasets to determine how variations in human genetic profiles may influence the efficacy of a given therapeutic entity. In some embodiments, the entity applicability engine 235 may integrate immunogenicity assessments to evaluate whether a humanized sequence is likely to trigger an unwanted immune response.

In some embodiments, the entity applicability engine 235 may use different methodologies to refine applicability predictions based on diverse patient populations and disease contexts. The entity applicability engine 235 may analyze differences in antigen expression levels across patient subgroups using machine learning models trained on clinical datasets to predict potential variations in treatment response. In some implementations, the entity applicability engine 235 may employ structural modeling tools to simulate antigen-antibody interactions under physiological conditions, accounting for factors such as pH, post-translational modifications, and glycosylation patterns. In some implementations, the entity applicability engine 235 may incorporate real-world clinical data, such as adverse event profiles from existing therapeutics, to assess potential liabilities associated with a given entity. The entity applicability engine 235 may further refine applicability predictions by integrating experimental validation data, such as in vitro binding assays and in vivo pharmacokinetic studies to evaluate whether computational assessments align with empirical results.

In some embodiments, the threshold determination engine 240 may determine the distance threshold for identifying target-contacting residues in a humanized sequence, such as a humanized antibody sequence. Based on the threshold, one or more analytics devices 115 may analyze structural models of antibody-antigen interactions to assess which residues fall within a specified range of the target antigen. The threshold determination engine 240 may employ computational methods, such as molecular docking, electrostatic potential mapping, and atomic distance calculations, to identify key interacting residues. In some embodiments, the threshold determination engine 240 may suggest a range of possible distance thresholds based on structural characteristics of the candidate humanized sequence and the target antigen. The suggested thresholds may be derived from training data containing validated antibody-antigen complexes and experimentally determined contact residues. In some embodiments, the threshold determination engine 240 may refine threshold recommendations by evaluating factors such as residue conservation, solvent accessibility, and hydrogen bonding potential to ensure that selected thresholds capture functionally relevant interactions.

In some embodiments, the threshold determination engine 240 may incorporate a human-in-the-loop process to allow manual refinement of distance threshold selections. The threshold determination engine 240 may generate a set of threshold options, each corresponding to different levels of stringency for defining target-contacting residues. A user may review the suggested thresholds and select the most appropriate one based on experimental data, therapeutic objectives, or manufacturability considerations. In some embodiments, the threshold determination engine 240 may provide visual representations of binding interactions, highlighting residue proximity to the antigen under different threshold settings. In some embodiments, the threshold determination engine 240 may adjust future threshold recommendations by incorporating human feedback into its predictive model to refine its threshold selection criteria over time. The threshold determination engine 240 may also integrate experimental validation data, such as crystallographic structures or surface plasmon resonance measurements, to iteratively improve distance threshold accuracy.

In some embodiments, the affinity improvement engine 245 may alter the sequence of a humanized antibody candidate to enhance the candidate's binding affinity while using identified target-contacting residues (e.g., through the threshold determined based on threshold determination engine 240) as preservation constraints. The affinity improvement engine 245 may employ machine learning models to propose beneficial mutations to the sequence data that strengthen antigen interaction while maintaining stability and manufacturability. The affinity improvement engine 245 may first analyze the existing binding interface and identify positions where amino acid substitutions may improve affinity through enhanced hydrogen bonding, van der Waals interactions, or electrostatic complementarity. In some implementations, the affinity improvement engine 245 may use sequence-based predictive models trained on datasets of high-affinity antibodies to suggest optimal residue substitutions. The affinity improvement engine 245 may then apply structural modeling techniques to simulate the impact of proposed mutations on the three-dimensional conformation of the antibody. In some embodiments, the affinity improvement engine 245 may integrate manufacturability constraints to ensure affinity-enhancing modifications do not introduce aggregation-prone regions or disrupt expression efficiency.

In some embodiments, while the target-contacting residues are inputted into the affinity improvement engine 245 as preservation constraints, this does not necessarily mean that the sequences in the target-contacting residues are unchanged. In some situations, the target-contacting residues' sequences being intact are being inputted as a hard constraint to the machine learning model used in by the affinity improvement engine 245. In other situations, such target-contacting residues' sequences are merely used as soft constraints in engineering the sequence. For example, the affinity improvement engine 245 may analyze the structural and energetic contributions of these residues and determine whether selective modifications may enhance binding affinity without disrupting target recognition. The affinity improvement engine 245 may apply computational modeling to explore conservative mutations that retain key interactions while optimizing binding strength. In some embodiments, the affinity improvement engine 245 may generate alternative residue substitutions within the target-contacting region, provided that such modifications do not significantly alter the overall antigen-binding interface. In some embodiments, the affinity improvement engine 245 may assess the flexibility of certain residues within the binding site and introduce modifications that improve conformational stability or increase interaction specificity.

In some embodiments, the affinity improvement engine 245 may use one or more machine learning approaches to refine affinity predictions and optimize sequence modifications. For example, transformer-based large language models (LLMs) trained on antibody sequence datasets may generate mutation proposals based on patterns observed in high-affinity antibodies. Diffusion models may iteratively refine sequences by introducing small, functionally relevant modifications that maximize affinity while maintaining structural integrity. Physics-based molecular docking simulations may predict the energetic effects of mutations on antigen binding, ensuring that proposed changes improve interaction strength. Reinforcement learning models may be employed to iteratively test and optimize sequence modifications by simulating binding outcomes and selecting mutations that yield the highest predicted affinity. In some embodiments, convolutional neural networks (CNNs) trained on structural data may analyze spatial relationships within the antibody-antigen interface to identify residue positions most amenable to modification.

In some embodiments, the candidate verification engine 250 may evaluate humanized antibody candidates with improved affinity by communicating with analytics devices 115 to perform laboratory validation. Human-in-the-loop may be involved in verification of candidates. The candidate verification engine 250 may facilitate the experimental assessment of computationally optimized sequences by guiding the selection of high-confidence candidates for physical synthesis and biochemical testing. The candidate verification engine 250 may integrate predictive scoring from affinity improvement engine 245 with experimental validation data from analytics devices 115 to evaluate whether computationally proposed modifications translate into real-world affinity gains. In some embodiments, candidate verification may include the synthesis and expression of antibody candidates and the verification of the candidates for structural and functional assays. Candidate verification may compare predicted binding affinity values with empirical measurements obtained from biophysical techniques such as surface plasmon resonance (SPR), isothermal titration calorimetry (ITC), or biolayer interferometry (BLI). In some embodiments, candidate verification may assess structural integrity through techniques such as X-ray crystallography or cryo-electron microscopy (cryo-EM), verifying that optimized candidates maintain their predicted three-dimensional conformations. Some of the candidate verification procedures may be performed automatically by the candidate verification engine 250 while others may be performed manually by human.

In some embodiments, candidate verification may evaluate manufacturability factors, including aggregation propensity, thermal stability, and expression yield, ensuring that affinity-enhanced candidates remain viable for large-scale production. In some embodiments, candidate verification may involve assessing proteolytic stability to determine whether antibody candidates exhibit susceptibility to degradation under physiological conditions. In some embodiments, candidate verification may include forced degradation studies, exposing antibody candidates to heat, pH stress, and oxidative conditions to evaluate structural resilience and long-term stability. In some embodiments, candidate verification may include assessing post-translational modifications such as glycosylation patterns, ensuring that engineered antibodies maintain favorable pharmacokinetics and immunogenicity profiles. Analytical ultracentrifugation and size-exclusion chromatography (SEC) may be used to detect the presence of oligomers or misfolded species, confirming that affinity-enhanced candidates retain monodispersity in solution. In some embodiments, candidate verification may include differential scanning calorimetry (DSC) and nano differential scanning fluorimetry (nanoDSF) to assess conformational stability by determining the melting temperature (Tm) of antibody candidates. The verification process may also include functional cell-based assays to confirm that affinity-enhanced antibodies exhibit expected biological activity, such as receptor engagement or immune effector function activation.

In some embodiments, the feedback improvement engine 255 may utilize laboratory data generated by candidate verification as ground truth to further train and refine the affinity improvement engine 245. The feedback improvement engine 255 may compare predicted affinity values with experimental results, identifying discrepancies between computational models and empirical outcomes. In some implementations, the feedback improvement engine 255 may apply machine learning techniques to iteratively retrain predictive models based on real-world binding data, optimizing mutation selection strategies for subsequent antibody optimization cycles. The feedback improvement engine 255 may also integrate structural validation results, using experimentally determined antibody-antigen complex structures to refine docking algorithms and interaction modeling approaches. In some embodiments, the feedback improvement engine 255 may incorporate manufacturability and stability data to improve sequence selection criteria to reduce the likelihood of proposing modifications that introduce aggregation risks or expression challenges. By leveraging an iterative feedback loop between computational modeling and laboratory validation, the feedback improvement engine 255 may enhance the accuracy and reliability of affinity optimization processes.

The application programming interface (API) 260 provides various application communication interfaces for the entity engineering system 110 to communicate with other systems, including with a client device 130 and a model serving system 140. For example, a client device 130 may invoke one or more machine learning models that are operated by the entity engineering system 110 through the API. API may be in compliance with any common API standards such as Representational State Transfer (REST), query-based API, Webhooks, etc. The data transferred through the API may be in formats such as JSON and XML.

The user interface engine 265 may be a software application interface that is provided and operated by the entity engineering system 110. For example, the entity engineering system 110 may provide a simulation tool for a client to design and study the properties of an entity such as an antibody. The entity engineering system 110 may also provide visual simulation to a particular entity.

The user interface engine 265 may take different forms. In one embodiment, the user interface engine 265 may control or be in communication with an application that is installed in a client device 130. For example, the application may be a cloud-based SaaS or a software application that can be downloaded in an application store (e.g., APPLE APP STORE, ANDROID STORE). The user interface engine 265 may be a front-end software application that can be installed, run, and/or displayed on a client device 130. The user interface engine 265 also may take the form of a webpage interface of the entity engineering system 110 to allow clients to access data and results through web browsers. In some embodiments, the user interface engine 265 may not include graphical elements but may provide other ways to communicate, such as through APIs 260.

Sequence Engineering Pipeline

Figure 3:
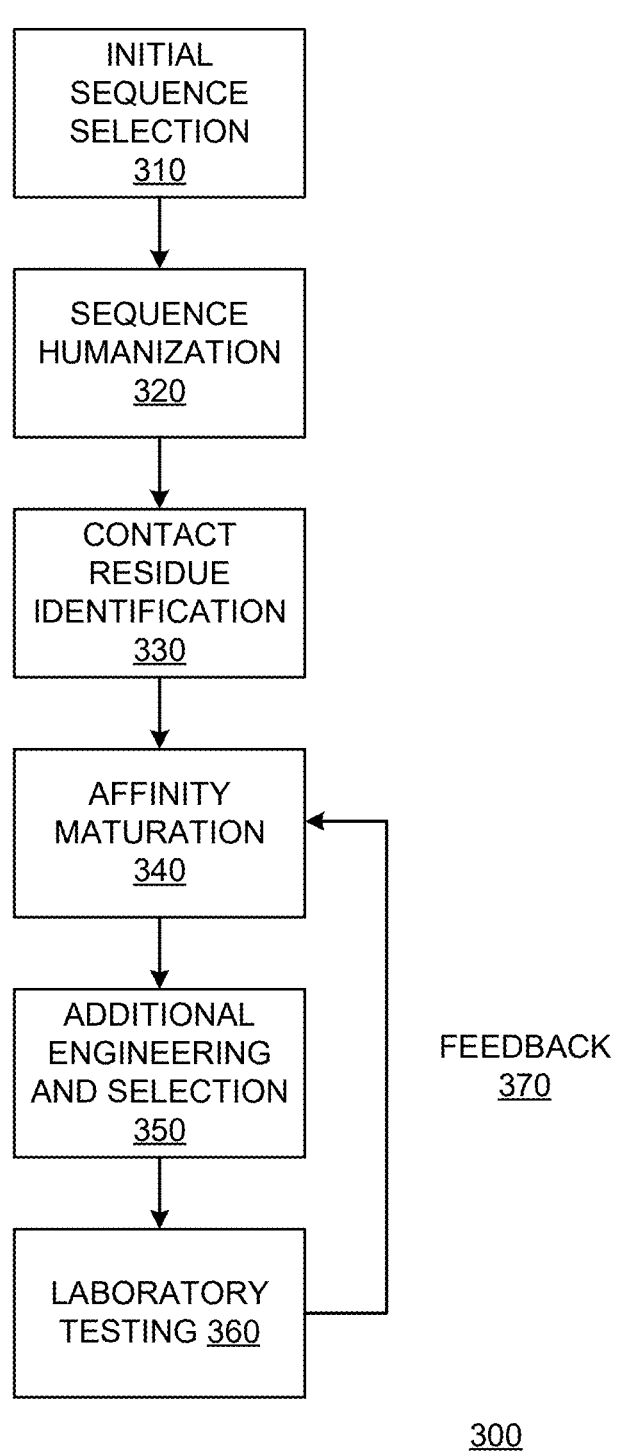
FIG. 3 is a block diagram illustrating an entity engineering process, in accordance with some embodiments.

FIG. 3 is a block diagram illustrating an entity engineering process 300, in accordance with some embodiments. In some embodiments, the entity engineering process 300 may be used for another type of therapeutic entity. While the stages in the entity engineering process 300 are described as being performed by the entity engineering system 110, in various embodiments one or more stages may also be performed manually or performed semi-automatically such as using a human-in-the-loop technique. In different embodiments, the entity engineering process 300 may also include additional, fewer, or different stages as illustrated in FIG. 3.

In some embodiments, in initial sequence selection stage 310, the entity engineering system 110 may identify suitable starting points for entity engineering. For example, in antibody engineering, the entity engineering system 110 may analyze known antibody sequences derived from animals, such as mice or other suitable mammals, which are commonly used for generating high-affinity binders through immunization. These sequences serve as the initial sequences for further engineering and may be obtained through conventional immunization and extraction methods or from genetically engineered mice that produce fully human antibodies. In some embodiments, the entity engineering system 110 may access and analyze extensive libraries of known animal-derived antibody sequences to predict which sequences are most likely to perform well after humanization.

In some embodiments, the entity engineering system 110 may also identify and utilize alternative antibody-based constructs, such as camelid nanobodies. Nanobodies, for example derived from llamas and camels, possess unique structural characteristics that enable high specificity and stability while being significantly smaller than traditional antibodies. The entity engineering system 110 may analyze and optimize nanobody sequences for human compatibility. In some embodiments, the entity engineering system 110 may facilitate the design of hybrid constructs that incorporate nanobody regions with traditional antibody scaffolds to generate novel therapeutic formats with enhanced properties.

In some embodiments, the entity engineering system 110 may use large-scale sequence analysis and computational modeling to prioritize initial sequences based on sequences' potential for successful humanization and affinity maturation. The entity engineering system 110 may employ machine learning models, statistical analysis, and sequence alignment techniques to compare candidate sequences against a reference library store 120 comprising human antibody sequences. The entity engineering system 110 may apply a scoring mechanism that considers factors such as sequence similarity, framework stability, and potential immunogenicity.

In some embodiments, the entity engineering system 110 may apply structural modeling techniques to assess the three-dimensional conformation of initial antibody sequences. The entity engineering system 110 may leverage predictive tools such as AlphaFold or other diffusion models to simulate folding patterns and interactions with target antigens. The predictive models may assist in determining whether an initial sequence is structurally viable for subsequent humanization and affinity maturation.

In some embodiments, the entity engineering system 110 may integrate external databases and proprietary datasets to enhance the selection process. The entity engineering system 110 may retrieve antibody sequence data from publicly available sources, including international ImMunoGeneTics information system (IMGT), Observed Antibody Space (OAS), and the Protein Data Bank (PDB), as well as proprietary libraries containing experimentally validated sequences. In some embodiments, the entity engineering system 110 may also select initial sequences from U.S. Food and Drug Administration (FDA) approved therapeutic antibodies.

In some embodiments, in the sequence humanization stage 320, the entity engineering system 110 may perform sequence humanization to convert an initial data sequence into more humanized data sequence candidates (e.g., humanized antibody candidates) while preserving binding affinity and stability. For example, the initial data sequence may be an initial antibody sequence selected in the initial sequence selection stage 310 and may include a majority of the sequence from a non-human species (e.g., antibodies from a non-human mammal, insect and bacterial derived protein scaffolds). The entity engineering system 110 may analyze non-human antibody sequences derived from sources such as mouse or camelid antibodies and identify regions that require substitution to reduce immunogenicity. The entity engineering system 110 may access a reference library store 120 containing a comprehensive database of human antibody sequences and use computational models to identify the suitable human sequence replacements.

The humanization process that replace non-human sequences with humanized sequences may occur at any region of an antibody, including the complementarity-determining regions (CDRs), framework regions (FRs), variable regions (VH and VL), constant regions (CH and CL), Fab region, Fv region, Fc region, hinge region, and other structural domains that influence antigen binding, stability, manufacturability, and immunogenicity.

In some embodiments, the entity engineering system 110 may employ different strategies to select an appropriate human template for sequence humanization. Examples of certain strategies are further discussed in FIG. 5A through FIG. 5C. In some embodiments, the entity engineering system 110 may utilize a lookup-based approach, which may be referred to as a "phone-book approach," in which a database of human antibody sequences is searched for the closest match to the non-human sequence. A direct lookup method may provide a biologically relevant reference for humanization. Alternatively, or additionally, the entity engineering system 110 may apply machine learning models to predict the best human sequence based on structural compatibility and functional preservation. These predictive models may analyze large-scale sequence data to optimize humanization decisions beyond simple sequence similarity.

In some embodiments, the entity engineering system 110 may implement a machine learning-based approach in the sequence humanization stage 320. The entity engineering system 110 may utilize transformer-based models or other deep-learning architectures trained on large antibody sequence libraries to predict suitable humanization substitutions. The entity engineering system 110 may integrate a multi-step evaluation framework, in which an initial model proposes humanized sequences based on learned patterns of antibody evolution, and a secondary judge model filters out unstable or low-affinity candidates. The entity engineering system 110 may incorporate structure-aware learning, in which sequence modifications are assessed based on predicted three-dimensional interactions with target antigens. In some implementations, the entity engineering system 110 may use a scoring mechanism that balances sequence human-likeness, structural integrity, and functional affinity to prioritize the most promising candidates. In some embodiments, the entity engineering system 110 may leverage reinforcement learning techniques to iteratively refine model predictions based on laboratory validation data, enhancing future humanization predictions. The entity engineering system 110 may use one or more machine learning models to generate humanized antibody candidates that retain binding affinity while reducing immunogenicity.

In some embodiments, the entity engineering system 110 may determine which portions of the non-human sequence should be replaced while maintaining target binding interactions. The entity engineering system 110 may perform a structural analysis to evaluate the effects of humanization on the three-dimensional conformation of the antibody. The entity engineering system 110 may use predictive modeling tools, such as AlphaFold or diffusion models, to assess whether proposed sequence substitutions maintain structural integrity and binding efficiency. The entity engineering system 110 may also analyze interaction networks within the antibody framework to identify critical residues that contribute to stability and antigen binding.

In some embodiments, the entity engineering system 110 may systematically replace non-human residues with human-derived sequences from the reference library store 120. The entity engineering system 110 may apply an optimization algorithm to minimize the number of substitutions while maximizing human sequence similarity. The entity engineering system 110 may also evaluate sequence modifications based on manufacturability considerations to determine whether humanized candidates retain favorable biophysical properties such as solubility and stability. The entity engineering system 110 may incorporate manufacturability scoring metrics to filter out sequences prone to aggregation or poor expression. In some embodiments, the entity engineering system 110 may incorporate a validation mechanism to ensure that humanized sequences retain their functional properties. The entity engineering system 110 may perform in silico simulations to evaluate whether sequence substitutions disrupt folding patterns or antigen recognition. The entity engineering system 110 may also integrate experimental data from an analytics device 115 to refine predictive models and improve humanization accuracy. Laboratory testing may provide feedback that allows the entity engineering system 110 to adjust humanization criteria dynamically, enhancing future predictions.

In some embodiments, in sequence humanization stage 320, the entity engineering system 110 may generate multiple humanized data sequence candidates (e.g., humanized antibody candidates) with different sequence variations. The entity engineering system 110 may prioritize candidates based on predicted binding affinity, structural stability, and sequence similarity to known human antibodies. The generated data sequence candidates may then be assessed in further optimization steps, such as affinity maturation stage 340, to enhance therapeutic potential. In some embodiments, the entity engineering system 110 may output a structured dataset containing humanized antibody sequences and corresponding metadata.

In some embodiments, in contact residue identification stage 330, the entity engineering system 110 identifies target-contacting residues within a humanized data sequence candidate (e.g., an antibody sequence candidate) to identify target binding interactions that can be used as preservation constraints in engineering of the sequence candidates. One or more humanized sequences may be generated in the sequence humanization stage 320 and the humanized sequences are analyzed in the contact residue identification stage 330 to identify target-contacting residues. The entity engineering system 110 may employ computational docking simulations, structural prediction models, and machine learning algorithms to determine which amino acid residues within the antibody directly interact with the target antigen. The identification of these residues enables selective preservation of key binding sites while allowing for modifications to other regions that enhance human compatibility and manufacturability.

In some embodiments, in contact residue identification stage 330, the entity engineering system 110 may identify target-contacting residues within a humanized data sequence candidate to determine critical binding interactions. When target-contacting residues are identified, the entity engineering system 110 may analyze the humanized sequences to assess whether modifications introduced during sequence humanization stage 320 have altered key binding interactions. In some embodiments, the entity engineering system 110 may selectively revert one or more humanized sequence modifications to the original sequence to preserve or restore affinity. The reversion process may be guided by structural modeling and machine learning-based affinity predictions to ensure that only modifications detrimental to binding interactions are adjusted. The entity engineering system 110 may evaluate sequence reversions based on predicted stability, manufacturability, and immunogenicity to maintain therapeutic potential while ensuring optimal antigen binding.

In different embodiments, the starting point of the entity engineering process 300 may vary depending on the type of therapeutic application. For certain therapeutics, such as oncology drugs, the entity engineering system 110 may initiate the process at the initial sequence selection stage 310 by identifying suitable non-human antibody sequences or other therapeutic entities for engineering. These sequences may be derived from immunized animal models or other sources optimized for high-affinity binding to tumor-associated antigens. In contrast, for therapeutics targeting infectious diseases, the entity engineering process 300 may begin at the contact residue identification stage 330, where a known human antibody sequence is used as the starting sequence. In such cases, the entity engineering system 110 may analyze the pre-existing human antibody candidate to identify target-contacting residues before further optimization, such as affinity maturation or sequence refinement, to enhance therapeutic efficacy while maintaining human compatibility.

In some embodiments, the entity engineering process 300 may also begin at the contact residue identification stage 330 when engineering alternative antibody constructs, such as camelid nanobodies, which possess unique structural properties distinct from conventional antibodies. Nanobody sequences may already exhibit favorable stability and solubility characteristics but require optimization to enhance target affinity or reduce immunogenicity. In such cases, the entity engineering system 110 may analyze known nanobody sequences and identify target-contacting residues to establish preservation constraints before introducing modifications. The entity engineering system 110 may employ computational docking simulations and structural modeling tools to determine key interaction sites within the nanobody framework. Following target-contacting residue identification, the entity engineering system 110 may implement sequence refinement strategies to improve binding strength while ensuring that essential nanobody properties, such as small molecular size and high stability, are maintained. This approach allows for the optimization of nanobody-based therapeutics for various applications, including penetrating dense tissues, crossing biological barriers, and achieving prolonged stability in physiological environments.

In some embodiments, contact residue identification may be performed using either or both computational techniques and laboratory techniques. By way of examples, the entity engineering system 110 may analyze humanized antibody candidates by computationally mixing the sequences with the target antigen or physically mixing the antibody candidates with the target antigen in laboratory.

Computationally, the entity engineering system 110 may generate predicted binding interfaces through molecular docking simulations, such as by positioning the antibody structure relative to the antigen and evaluating potential interaction sites. The entity engineering system 110 may utilize predictive structural modeling tools, such as AlphaFold or Rosetta, to assess the three-dimensional conformation of the antibody-antigen complex and identify residues that are spatially proximate to the antigen binding site.

For laboratory techniques, one or more analytics devices 115 may be used to conduct laboratory assays that confirm binding interactions. Experimental techniques such as surface plasmon resonance (SPR) or isothermal titration calorimetry (ITC) may be employed to measure the binding affinity of humanized antibody candidates and verify that preserved contact residues maintain antigen recognition. In some embodiments, one or more analytics devices 115 may be used to determine target-contacting residues through structural analysis, biophysical interaction assays, and mutagenesis-based functional studies. Structural determination techniques such as X-ray crystallography, cryo-electron microscopy (cryo-EM), and nuclear magnetic resonance (NMR) spectroscopy may provide high-resolution data of the antibody-antigen complex to identify residues involved in binding. The analytics device 115 may further employ hydrogen-deuterium exchange mass spectrometry (HDX-MS) and cross-linking mass spectrometry (XL-MS) to probe the binding interface and confirm computationally predicted contact residues. Biophysical assays such as surface plasmon resonance (SPR), isothermal titration calorimetry (ITC), and biolayer interferometry (BLI) may be used to quantify binding kinetics, thermodynamics, and stability, ensuring that preserved residues remain functionally critical for antigen recognition.

While some of the target-contacting residues are likely to be in CDRs of a sequence candidate, the target-contacting residues may also be in any identified regions of the antibody as verified by laboratory testing.

In some embodiments, the entity engineering system 110 determines distance thresholds to identify target-contacting residues. The entity engineering system 110 may employ a distance-based cutoff, wherein residues within a predefined distance-such as 5 angstroms—from the antigen surface are classified as contact residues. Sensitivity analyses may be performed, computationally or manually, to refine the distance threshold, testing various cutoffs (e.g., 4 angstroms, 5 angstroms, or 6 angstroms) to balance specificity and sensitivity. A stringent threshold may exclude residues that contribute to binding affinity, while a relaxed threshold may include residues that are not functionally critical. The distance threshold may be iteratively adjusted based on computational predictions and experimental validations.

In some embodiments, the entity engineering system 110 may integrate a human-in-the-loop process for refining contact residue identification. Expert review may be incorporated in determining distance threshold, and validating and adjusting computationally determined binding interfaces. The entity engineering system 110 may generate interactive visualizations of antibody-antigen interactions, allowing researchers to manually inspect and confirm residue classifications and determine an appropriate threshold distance.

In some embodiments, the entity engineering system 110 may perform benchmarking against known antibody structures to validate the accuracy of contact residue identification. The entity engineering system 110 may compare predicted contact residues with experimentally determined binding interfaces from antibody structures stored in databases such as the Protein Data Bank (PDB). The entity engineering system 110 may compute similarity scores between computationally predicted and experimentally validated contact residue sets to assess the reliability the identified contact residue sequences.

In some embodiments, in the affinity maturation stage 340, the entity engineering system 110 uses humanized antibody sequences and the identified target-contacting residues as preservation constraints for further engineering to improve affinity. The entity engineering system 110 may iteratively refine data sequences to enhance binding strength while preserving stability and manufacturability. The entity engineering system 110 may utilize machine learning models to explore potential sequence modifications. In the affinity maturation stage 340, all lines of candidates may be combined and used to generate a combined set of affinity-matured and humanized variants.

Various machine learning models may be used in the affinity maturation stage 340. In some implementations, the entity engineering system 110 may use transformer-based models trained (e.g., fine tuned) on large antibody sequence databases to predict affinity-enhancing mutations. The transformer-based models may analyze contextual relationships between residues and suggest modifications that increase binding strength without disrupting the global structure of the antibody.

In some embodiments, the entity engineering system 110 may use diffusion models to introduce incremental sequence modifications, generating variants by iteratively refining an initial humanized sequence. A machine learning model may be used to evaluate structural perturbations introduced by each modification and adjust sequences to maintain favorable binding interactions.

In some embodiments, the entity engineering system 110 may employ reinforcement learning frameworks to increase affinity while adhering to structural and functional constraints. The entity engineering system 110 may implement a reward-based learning mechanism, wherein sequence modifications that improve binding affinity without introducing instability or aggregation tendencies receive higher rewards. For example, the reinforcement learning framework may explore sequence space through guided optimization.

In some implementations, the entity engineering system 110 may use a constraint-based optimization approach to use the identified target-contacting residues as preservation constraints. In some embodiments, the constraints may be implemented as hard constraints that limit the degree of sequence change (e.g., no change at all, a single site change, two site changes, etc.) in the identified target-contacting residues. The entity engineering system 110 may analyze structural models and interaction maps to determine the extent to which contact residues contribute to antigen recognition, guiding the application of these hard constraints to prevent detrimental modifications.

In some embodiments, the constraints may be implemented as soft constraints where the contact residue sequence can be changed but one or more features in a contact residue sequence cannot be altered. These features may include the type of molecular interaction (e.g., hydrogen bonding, hydrophobic packing, electrostatic interactions), the spatial positioning of antigen contact sites, the energetic contribution of individual residues to the overall binding affinity, or the structural conformation for stable antigen binding. The entity engineering system 110 may employ deep learning models to predict whether alternative amino acid substitutions can maintain these key properties while improving affinity or manufacturability. The entity engineering system 110 may also implement weighted optimization algorithms that prioritize sequence modifications least likely to disrupt critical antigen interactions.

In some implementations, the entity engineering system 110 may use constraint relaxation strategies to explore affinity-enhancing mutations in contact residues while ensuring that functionally critical interactions remain intact. The entity engineering system 110 may dynamically adjust constraints based on affinity predictions to allow modifications only when modifications are predicted to improve binding strength without introducing destabilizing effects. The entity engineering system 110 may iteratively refine sequence modifications through feedback loops, engineering for both affinity enhancement and manufacturability.

In some embodiments, the entity engineering system 110 may integrate these constraint-based optimization techniques with reinforcement learning frameworks. The entity engineering system 110 may use reinforcement learning reward functions that penalize modifications disrupting contact features while incentivizing beneficial mutations that enhance binding.

In some embodiments, the entity engineering system 110 may selectively introduce mutations in non-contact regions, focusing on framework residues and complementarity-determining regions (CDRs) that influence binding strength.

The entity engineering system 110 may employ a secondary validation model to assess proposed mutations, filtering out sequences predicted to introduce unfavorable biophysical properties such as aggregation or instability. The secondary validation model may function as a judge model, evaluating the trade-offs between affinity improvement and undesirable features. The judge model may score candidate sequences based on multiple factors, including predicted binding affinity, structural stability, expression yield, and immunogenicity risk. In some implementations, the judge model may integrate predictive analytics derived from large-scale datasets of successful therapeutic antibodies to identify patterns associated with optimal binding and developability. The entity engineering system 110 may iteratively refine sequence modifications based on feedback from the judge model.

In some embodiments, the entity engineering system 110 may rank affinity-matured variants based on predicted binding strength, stability, and manufacturability. The entity engineering system 110 may employ structural modeling tools to validate the three-dimensional interactions of proposed sequences. The entity engineering system 110 may utilize computational docking simulations to predict antigen-antibody interactions and assess the impact of each modification. The entity engineering system 110 identifies next-generation antibody variants that surpass naturally occurring sequences in binding affinity and therapeutic potential.

In some embodiments, in additional engineering and selection stage 350, the entity engineering system 110 may perform an additional sequence humanization following the affinity maturation stage 340 to further align the optimized antibody sequences, such as affinity-matured and humanized variants, with human antibody frameworks while retaining the enhanced binding properties achieved in the prior stages. The entity engineering system 110 may refine non-contact framework residues to improve manufacturability, stability, and immunogenicity while preserving the evolved target affinity. In some embodiments, the entity engineering system 110 may compare the engineered sequences against reference libraries of human antibody sequences to identify and implement additional substitutions that further humanize the candidate without compromising structural integrity.

In some embodiments, the entity engineering system 110 may execute a candidate selection process to rank the affinity-matured and humanized variants based on multiple criteria, such as predicted binding strength, structural stability, and immunogenicity risk. In some embodiments, the entity engineering system 110 may generate multiple sequence variants with slight modifications to account for potential variations in manufacturability and stability to generate a diverse set of optimized candidates before laboratory validation.

In some embodiments, in laboratory testing stage 360, laboratory testing is performed to validate the engineered data sequences. Laboratory testing may include testing to confirm binding affinity, stability, and manufacturability. The entity engineering system 110 may interface with one or more analytics devices 115 to conduct assays such as surface plasmon resonance (SPR), biolayer interferometry (BLI), and functional bioassays. These experimental techniques generate real-world affinity data that is used to evaluate whether the engineered sequences maintain or improve target binding. The testing phase may include generating recombinant antibody constructs, expressing these constructs in mammalian or bacterial cells, and purifying the proteins for experimental evaluation. The entity engineering system 110 may analyze kinetic parameters such as association rate ($k_{on}$) and dissociation rate ($k_{off}$) to determine the binding efficiency of humanized and affinity-matured candidates. Structural assessments through X-ray crystallography or cryo-electron microscopy (cryo-EM) may be employed to validate whether predicted structural changes align with actual molecular conformations.

In some embodiments, in the feedback stage 370, the entity engineering system 110 processes affinity and stability data generated through laboratory assays and incorporates the results into a feedback loop for refining one or more predictive models used in the affinity maturation stage 340. In some embodiments, the entity engineering system 110 processes the laboratory-generated data to improve the AI models by continuously retraining the AI models with ground-truth experimental results. The feedback process involves integrating experimental binding affinities into the model's training dataset, allowing subsequent AI-generated sequences to be refined based on empirical outcomes. The entity engineering system 110 may adjust hyperparameters of the machine learning models, optimize training weights, and introduce new constraints based on manufacturability considerations. In some embodiments, the entity engineering system 110 may implement reinforcement learning algorithms to prioritize sequence modifications that lead to successful experimental outcomes.

In some embodiments, the entity engineering system 110 may iteratively filter and refine candidate sequences by identifying patterns in experimental successes and failures. The successes and failures may used as labels in supervised training. Sequences that demonstrate high affinity but exhibit manufacturability issues, such as aggregation or low expression yields, may be modified to enhance stability while maintaining target binding. The entity engineering system 110 may utilize predictive models to identify mutations that reduce immunogenicity while preserving function.

In some embodiments, the entity engineering system 110 iteratively refines the AI models used in the affinity maturation stage 340 by identifying discrepancies between predicted and experimentally observed data and adjusting model parameters accordingly. AI-driven sequence design strategies are continuously validated and improved through a closed-loop feedback mechanism. For example, the entity engineering system 110 may process failure cases where AI-predicted sequences do not perform as expected in laboratory testing. The entity engineering system 110 may analyze deviations between predicted and experimental binding affinities to refine its structural modeling capabilities. Computational adjustments may involve recalibrating contact residue predictions, refining solvent accessibility parameters, or adjusting homology-based sequence selection thresholds. The entity engineering system 110 may also generate counterfactual predictions by modifying failed sequences and reintroducing them into the affinity prediction pipeline to determine alternative optimization pathways.

The entity engineering system 110 may interface with reference library store 120 and data store 125 to dynamically update sequence repositories with validated high-affinity antibody variants. AI models hosted in model serving system 140 may be periodically retrained with the latest experimental findings to enhance prediction accuracy.

In some embodiments, the entity engineering system 110 facilitates a rapid development cycle by minimizing the number of experimental iterations required to reach an optimized antibody candidate. Traditional antibody discovery methods often involve labor-intensive screening processes with a high attrition rate. By integrating AI predictions with experimental validation, the entity engineering system 110 significantly reduces the number of failed candidates by prioritizing sequences with high predicted success rates. This approach enables more efficient resource allocation in laboratory settings while accelerating the transition from computational modeling to clinically relevant antibody development.

Entity Engineering Process

FIG. 4A is a flowchart depicting an entity engineering process 400, in accordance with some embodiments. FIG. 4A may be performed automatically by the entity engineering system 110 or be performed partially with human. As such, while some of the steps are described as being performed by the entity engineering system 110, if applicable, the steps may also be performed at least partially by a human. In various embodiments, the entity engineering process 400 may include additional, fewer, or different steps. The steps in the entity engineering process 400 may also be performed in a different order than the illustration shown in FIG. 4A.

In some embodiments, the entity engineering system 110 may receive 405 an entity sequence that has a majority of regions originating from one or more non-target data sources. Examples of entity sequences can include protein sequences and other amino acid sequences. The entity sequence may correspond to a functional entity that requires adaptation for compatibility with target biological systems. Examples of non-target data sources can include data sources that store non-targets such as non-human species, synthetic constructs, or microbial origins. The entity sequence derived from a non-target source may originate from one or more sources, including but not limited to rodent-derived entities, rabbit-derived constructs, or specialized entity fragments. The entity engineering system 110 may retrieve the non-target entity sequence from a data source, such as a reference library store 120 containing known sequences of functional entities.

In some embodiments, the entity engineering system 110 may analyze the received entity sequence to determine its structural and functional properties. The entity engineering system 110 may employ machine learning models or sequence alignment techniques to classify the entity sequence based on similarity to known sequence families. The classification may involve identifying the source of origin and assessing the sequence's potential for adaptation. Adaptation may refer to modifying an entity sequence to enhance its compatibility with a specific target environment. Examples of adaptation processes include humanization of antibodies, modification of enzymes for improved catalytic function, and sequence refinement for increased stability. The entity engineering system 110 may also determine whether the entity sequence corresponds to a known functional entity.

In some embodiments, the entity engineering system 110 may process the entity sequence by segmenting the sequence into distinct sequence windows. The segmentation may facilitate subsequent analysis for adaptation, as certain regions may require replacement with target-compatible strings while preserving functionally critical structural elements. Examples of target-compatible strings include humanized antibody sequences, engineered binding motifs, and synthetic peptide linkers designed for structural compatibility. The segmentation may be performed using predefined sequence boundaries, such as framework regions and complementarity-determining regions (CDRs), or through computational partitioning methods based on sequence patterns.

In some embodiments, the entity engineering system 110 may replace 410 windows of data strings of the entity sequence with target-compatible strings to generate an adapted intermediate candidate sequence. The entity engineering system 110 may identify non-target sequence windows that require substitution and select appropriate target-compatible sequence counterparts to maintain structural and functional integrity. The replacement process may be performed using one or more computational techniques, including lookup-based approaches, machine learning-based predictions, and structural similarity assessments.

In some embodiments, the entity engineering system 110 may employ a lookup-based approach to replace non-target sequence windows. The entity engineering system 110 may retrieve a database of known target-compatible sequences stored in the reference library store 120 and compare the non-target sequence windows against target-compatible sequence counterparts. The entity engineering system 110 may identify matching target-compatible sequence windows based on a similarity threshold and substitute the non-target sequence windows with the corresponding target-compatible sequence windows. The similarity threshold may be determined based on sequence identity, structural compatibility, or evolutionary conservation.

In some embodiments, the entity engineering system 110 may refine the adaptation process by incorporating pattern elements associated with the target function. Examples of pattern elements include conserved sequence motifs or structural features that contribute to the functional properties of an entity sequence. Examples of pattern elements include enzyme active sites, antibody binding loops, and conserved regulatory domains in proteins. The entity engineering system 110 may retrieve target-compatible sequences from a curated sequence database and identify pattern elements relevant to maintaining the functional entity's operational properties. The entity engineering system 110 may match a non-target sequence region with the pattern elements based on functional similarity and substitute the non-target sequence region with a corresponding target-compatible pattern element. The functional similarity assessment may consider structural interactions, functional engagement, and manufacturability properties.

In some embodiments, the entity engineering system 110 may integrate structural validation techniques to ensure that target-compatible sequence replacements maintain the stability and functionality of the entity sequence. Entity structure may be the three-dimensional configuration of an entity sequence, which defines the entity's stability and functional potential. Examples of entity structures include folded proteins, nucleic acid secondary structures, and engineered macromolecular assemblies. The entity engineering system 110 may retrieve structural data from structural imaging, ultra-resolution scanning, or computational structure prediction models. The entity engineering system 110 may analyze conserved structural features to determine whether they should be maintained during adaptation. The entity engineering system 110 may validate adapted candidate sequences using structural stability simulations and select candidates that preserve configurational linkage.

In some embodiments, the entity engineering system 110 may identify 415 one or more data loci in the adapted intermediate candidate sequence. The identified data loci may be interaction sites of specific regions within an entity sequence that engage directly with a target. Examples of interaction sites include antigen-binding loops in antibodies, enzyme active sites, and receptor-ligand interfaces. The entity engineering system 110 may determine which structural elements in the adapted intermediate candidate sequence directly engage with a target. Those structural elements that interact or directly engage with the target may be target-contacting residues discussed in this disclosure. The identification of interaction sites may be performed using computational predictions, structural modeling, and analytical assessment techniques.

As consistent within this disclosure, a data locus may include a single sequence site (e.g., a single bit) or multiple sites. The word locus does not imply that a locus has more than one sites.

In some embodiments, after identifying data loci that are key interaction sites, the entity engineering system 110 may analyze the adapted intermediate candidate sequences to assess whether modifications introduced during replacement of target compatible string have altered key binding interactions. In some embodiments, the entity engineering system 110 may selectively revert one or more sequence modifications to the original sequence to preserve or restore affinity. The reversion process may be guided by structural modeling and machine learning-based affinity predictions to ensure that only modifications detrimental to binding interactions are adjusted. The entity engineering system 110 may evaluate sequence reversions based on predicted stability, manufacturability, and immunogenicity to maintain therapeutic potential while ensuring optimal antigen binding.

In some embodiments, the entity engineering system 110 may determine the entity structure of the adapted intermediate candidate sequence to facilitate the identification of interaction sites. The entity engineering system 110 may use computational structure prediction models, such as deep learning-based structure folding algorithms, molecular docking simulations, or comparative modeling techniques, to predict the three-dimensional conformation of the adapted sequence. The predicted structure may provide insight into how the adapted sequence engages with the target.

In some embodiments, the entity engineering system 110 may determine spatial separation distances between structural elements of the adapted intermediate candidate sequence and the target. Spatial separation distance may refer to the physical proximity between two molecular structures, which influences their ability to interact. Examples of spatial separation distances include atomic-level distances in binding interfaces, polymer chain spacing in macromolecules, and interdomain proximities in folded proteins. The entity engineering system 110 may analyze the spatial proximity of elements within the functional engagement interface and determine a distance threshold for identifying interaction sites. The distance threshold may be selected based on empirical data from known interacted assemblies or computational models trained on structural interaction datasets. Structural elements that fall within the selected distance threshold may be labeled as interaction sites.

In some embodiments, the entity engineering system 110 may verify the identified interaction sites through analytical assessments. Analytical assessment refers to any experimental or computational method used to confirm predicted interactions, stability, or function of an entity sequence, such as analytics that can be performed by analytics devices 115. Examples of analytical assessments include surface plasmon resonance (SPR), isothermal titration calorimetry (ITC), biolayer interferometry (BLI), and ultra-resolution scanning. The entity engineering system 110 may interface with one or more analytics devices 115 to conduct experimental validation using structural determination techniques such as structural imaging, ultra-resolution scanning, or nuclear magnetic resonance (NMR) spectroscopy.

In some embodiments, the entity engineering system 110 may compare the computationally predicted interaction sites with experimentally validated functional engagement sites. The entity engineering system 110 may assess the similarity between computational and laboratory-verified structural elements to refine the identification process. The entity engineering system 110 may adjust the interaction site selection criteria based on feedback from laboratory validation data to improve accuracy in subsequent adapted sequence evaluations.

In some embodiments, the entity engineering system 110 may store the identified interaction sites in a data store 125 for use in downstream optimization processes. The identified interaction sites may be used as preservation constraints in sequence refinement and association score optimization stages. The preservation of interaction sites may help maintain target engagement specificity while allowing for sequence modifications in non-contact regions to improve manufacturability, stability, and functional efficacy.

In some embodiments, the entity engineering system 110 may input 420 the adapted intermediate candidate sequence and the one or more interaction sites into a deep neural network to generate a set of one or more improved adapted candidate sequences that have a higher association score than the original entity sequence to the target. An association score may correspond to the strength of interaction between an entity sequence and its corresponding target. Examples of association scores include binding affinity in biomolecular interactions, enzyme-substrate interaction strength, and ligand-receptor binding efficiency. The entity engineering system 110 may use the identified interaction sites as preservation constraints to ensure that critical functional engagements with the target remain unchanged while optimizing the surrounding sequence regions for enhanced association scores.

In some embodiments, the entity engineering system 110 may define interaction sites that remain unchanged during the association score improvement process. The entity engineering system 110 may restrict sequence modifications to non-contact residues to allow optimization while preserving the functional engagement interface. The entity engineering system 110 may implement constraint-based optimization, wherein structural element substitutions are proposed only in regions outside the identified interaction sites.

In some embodiments, the entity engineering system 110 may establish preservation constraints that include features of the interaction sites. The preservation constraints may specify that modifications to the interaction sites are either completely restricted (e.g., hard constraints) or allowed only within a predefined extent (e.g., soft constraints). The entity engineering system 110 may iteratively adjust candidate sequences based on both association scores and adaptation scores, ensuring that modifications do not introduce destabilizing effects or reduce target specificity.

In some embodiments, the entity engineering system 110 may use a transformer-based model trained on entity sequence databases to predict performance-boosting alterations. Performance-boosting alterations may include sequence modifications that enhance the functional properties of an entity sequence without disrupting its essential interactions. Examples of performance-boosting alterations include affinity-enhancing mutations in biomolecules, thermostabilizing modifications in enzymes, and stability-improving mutations in engineered proteins. The entity engineering system 110 may provide the one or more interaction sites to the transformer-based model as preservation constraints. The transformer-based model may analyze contextual sequence relationships and suggest modifications that enhance association scores while maintaining the stability of the adapted sequence.

In some embodiments, the entity engineering system 110 may use a diffusion model to generate incremental sequence modifications. The diffusion model may iteratively refine the adapted intermediate candidate sequence by introducing small modifications at each step. The iterative refinement may allow the entity engineering system 110 to explore sequence space while ensuring that the optimized sequences maintain manufacturability and therapeutic potential.

In some embodiments, the entity engineering system 110 may employ a reinforcement learning technique to reward high association scores while maintaining structural and functional constraints. The reinforcement learning framework may implement a reward-based learning mechanism, prioritizing sequence modifications that improve association scores while penalizing modifications that disrupt preserved functional engagements. The reinforcement learning approach may iteratively refine candidate sequences by evaluating engagement outcomes and adjusting modifications based on predicted structural stability and manufacturability.

In some embodiments, the entity engineering system 110 may store the generated set of improved adapted candidate sequences in a data store 125. The entity engineering system 110 may assign confidence scores to each candidate sequence based on predicted association scores, structural stability, and manufacturability. The entity engineering system 110 may rank the improved adapted candidate sequences and select top-ranked sequences for further validation. The selected sequences may be processed in subsequent analytical assessments to confirm association scores and functional suitability.

In some embodiments, the entity engineering system 110 may output 425 the set of one or more improved adapted candidate sequences for analytical assessment of association scores with the target. Analytical assessments may include any experimental or computational methods used to confirm predicted interactions, stability, or function of an entity sequence. Examples of analytical assessments include surface plasmon resonance (SPR), isothermal titration calorimetry (ITC), biolayer interferometry (BLI), and ultra-resolution scanning techniques. The entity engineering system 110 may transmit the improved adapted candidate sequences to one or more analytics devices 115 for experimental validation. The verification process may involve assessing association scores, structural stability, manufacturability, and immunogenicity to confirm that the computationally optimized sequences retain functional properties.

In some embodiments, the entity engineering system 110 may prepare the improved adapted candidate sequences for analytical assessment by formatting them into a structured dataset. The dataset may include sequence metadata, predicted association scores, structural modeling outputs, and confidence metrics derived from computational optimization. The structured dataset may facilitate efficient downstream analysis and selection of candidates for synthesis and experimental testing.

In some embodiments, the entity engineering system 110 may interface with one or more analytics devices 115 to initiate analytical assessment procedures. Analytical assessment may include recombinant expression of the improved adapted candidate sequences, purification of the expressed entities, and biochemical characterization. The entity engineering system 110 may facilitate analytical experiments using biophysical assays such as surface plasmon resonance (SPR), isothermal titration calorimetry (ITC), and biolayer interferometry (BLI) to quantify association scores to the target.

In some embodiments, the entity engineering system 110 may process analytical assessment-generated data and compare experimental results with computational predictions. The entity engineering system 110 may analyze discrepancies between predicted and observed association scores and assess whether the optimized sequences maintain their expected structural integrity. The entity engineering system 110 may identify candidates that exhibit high association scores, structural stability, and manufacturability, prioritizing them for further development.

In some embodiments, the entity engineering system 110 may integrate feedback from analytical assessment into its predictive modeling pipeline. The entity engineering system 110 may use experimentally verified association score data to refine machine learning models used in optimization. The entity engineering system 110 may iteratively improve future adapted candidate sequence generation by incorporating validated experimental outcomes into the training data of its deep neural networks.

In some embodiments, the entity engineering system 110 may facilitate downstream decision-making by ranking the improved adapted candidate sequences based on analytical assessment results. The entity engineering system 110 may identify the top-performing candidates that demonstrate optimal association scores, stability, and manufacturability. The selected candidates may be advanced for further pre-clinical and clinical development as potential functional entities.

Protein Engineering Process

FIG. 4B is a flowchart depicting a protein engineering process 450, in accordance with some embodiments. The protein engineering process 450 is a specific example of the entity engineering process 400 in which the entity is an antibody, in accordance with some embodiments. FIG. 4B may be performed automatically by the entity engineering system 110 or be performed partially with human. As such, while some of the steps are described as being performed by the entity engineering system 110, if applicable, the steps may also be performed at least partially by a human. In various embodiments, the protein engineering process 450 may include additional, fewer, or different steps. The steps in the protein engineering process 450 may also be performed in a different order than the illustration shown in FIG. 4B.

In some embodiments, the entity engineering system 110 may receive 455 a protein sequence that has a majority of regions originating from one or more non-human mammals. The protein sequence may correspond to an antibody or other protein-based therapeutic entity that would benefit from or requires humanization for compatibility with human biological systems. The non-human protein sequence may be derived from one or more sources, including but not limited to murine, rabbit, or camelid antibodies. The entity engineering system 110 may retrieve the non-human protein sequence from a data source, such as a reference library store 120 containing known sequences of therapeutic entities.

In some embodiments, the entity engineering system 110 may analyze the received protein sequence to determine its structural and functional properties. The entity engineering system 110 may employ machine learning models or sequence alignment techniques to classify the protein sequence based on similarity to known sequence families. The classification may involve identifying the species of origin and assessing the sequence's potential for humanization. The entity engineering system 110 may also determine whether the protein sequence corresponds to a known therapeutic protein, such as a therapeutic antibody.

In some embodiments, the entity engineering system 110 may process the received protein sequence by segmenting the sequence into distinct sequence windows. The segmentation may facilitate subsequent analysis for humanization, as certain regions may require replacement with humanized sequence variants while preserving functionally critical residues. The segmentation may be performed using predefined sequence boundaries, such as framework regions and complementarity-determining regions (CDRs), or through computational partitioning methods based on sequence patterns.

In some embodiments, the entity engineering system 110 may replace 460 windows of the protein sequence with humanized regions to generate a humanized intermediate candidate sequence. The entity engineering system 110 may identify non-human sequence windows that require substitution and select appropriate humanized sequence counterparts to maintain structural and functional integrity. The replacement process may be performed using one or more computational techniques, including lookup-based approaches, machine learning-based predictions, and structural similarity assessments.

In some embodiments, the entity engineering system 110 may employ a lookup-based approach to replace non-human sequence windows. The entity engineering system 110 may retrieve a database of known human protein sequences stored in the reference library store 120 and compare the non-human sequence windows against human sequence counterparts. The entity engineering system 110 may identify matching human sequence windows based on a similarity threshold and substitute the non-human sequence windows with the corresponding human sequence windows. The similarity threshold may be determined based on sequence identity, structural compatibility, or evolutionary conservation.

In some embodiments, the entity engineering system 110 may use a machine learning-based approach to generate humanized sequence replacements. The entity engineering system 110 may input the protein sequence into a trained machine learning model that has been trained on human and non-human protein sequences. The machine learning model may generate one or more candidate humanized sequence windows by predicting substitutions that maximize sequence compatibility while preserving antigen-binding properties. The entity engineering system 110 may then score the generated humanized sequence windows based on sequence similarity, structural stability, and functional conservation. The entity engineering system 110 may substitute one or more windows of the protein sequence with the candidate humanized sequence windows that achieve the highest scoring.

In some embodiments, the entity engineering system 110 may apply a reference-based structural comparison to guide sequence replacement. The entity engineering system 110 may retrieve a reference set of human protein sequences and compute pairwise similarity scores between the non-human sequence windows and the reference set. The entity engineering system 110 may select a sequence similarity threshold for viable humanization candidates and replace the non-human sequence windows with humanized sequence windows that meet the similarity threshold. The reference-based approach may incorporate structural modeling to assess the compatibility of humanized substitutions with the overall conformation of the antibody.

In some embodiments, the entity engineering system 110 may refine the humanization process by incorporating functional motifs associated with the target protein function. The entity engineering system 110 may retrieve human protein sequences from a curated protein database and identify sequence motifs relevant to maintaining the protein's therapeutic function. The entity engineering system 110 may match a non-human sequence region with the sequence motifs based on functional similarity and substitute the non-human sequence region with a corresponding human sequence motif. The functional similarity assessment may consider structural interactions, binding affinity, and manufacturability properties.

In some embodiments, the entity engineering system 110 may integrate structural validation techniques to ensure that humanized sequence replacements maintain the stability and functionality of the protein sequence. The entity engineering system 110 may retrieve structural data from crystallography, cryo-electron microscopy, or computational structure prediction models. The entity engineering system 110 may analyze conserved structural features to determine whether they should be maintained during humanization. The entity engineering system 110 may validate humanized candidate sequences using structural stability simulations and select candidates that preserve folding and binding interactions. The integration of structural assessments may improve the likelihood that humanized candidates retain therapeutic efficacy while minimizing immunogenicity.

In some embodiments, the entity engineering system 110 may identify 465 one or more contact residue regions in the humanized intermediate candidate sequence. The entity engineering system 110 may determine which amino acid residues in the humanized intermediate candidate sequence directly interact with a drug target molecule. The identification of contact residue regions may be performed using computational predictions, structural modeling, and laboratory-based verification techniques. A contact residue region does not imply that the region has multiple sites. A single amino acid, a single base, or a single atom can constitute a contract residue region.

As consistent within this disclosure, a contact residue region may include a single amino acid site or multiple sites. The word region does not imply that a region has more than one sites.

In some embodiments, after identifying contact residue regions that are key interaction sites, the entity engineering system 110 may analyze the humanized intermediate candidate sequence to assess whether modifications introduced during replacement of humanized sequences have altered key binding interactions. In some embodiments, the entity engineering system 110 may selectively revert one or more sequence modifications to the original sequence to preserve or restore affinity. The reversion process may be guided by structural modeling and machine learning-based affinity predictions to ensure that only modifications detrimental to binding interactions are adjusted. The entity engineering system 110 may evaluate sequence reversions based on predicted stability, manufacturability, and immunogenicity to maintain therapeutic potential while ensuring optimal antigen binding.

In some embodiments, the entity engineering system 110 may determine the protein structure of the humanized intermediate candidate sequence to facilitate the identification of contact residue regions. The entity engineering system 110 may use computational structure prediction models, such as deep learning-based protein folding algorithms, molecular docking simulations, or comparative modeling techniques, to predict the three-dimensional conformation of the humanized sequence. The predicted structure may provide insight into how the humanized sequence interacts with the drug target molecule.

In some embodiments, the entity engineering system 110 may compute intermolecular distances between amino acid residues of the humanized intermediate candidate sequence and the drug target molecule. The entity engineering system 110 may analyze the spatial proximity of residues within the binding interface and determine a distance threshold for identifying contact residues. The distance threshold may be selected based on empirical data from known antibody-antigen interactions or computational models trained on structural interaction datasets. Residues that fall within the selected distance threshold may be labeled as contact residue regions.

In some embodiments, the entity engineering system 110 may refine the distance threshold determination by analyzing structural interaction data from known antibody-antigen complexes. The entity engineering system 110 may establish an empirical distance range that correlates with binding interactions observed in experimentally validated complexes. The entity engineering system 110 may determine the distance threshold based on the empirical distance range and apply it to the humanized intermediate candidate sequence to identify contact residue regions.

In some embodiments, the entity engineering system 110 may verify the identified contact residue regions through laboratory-based assays. The entity engineering system 110 may interface with one or more analytics devices 115 to conduct experimental validation using structural determination techniques such as X-ray crystallography, cryo-electron microscopy (cryo-EM), or nuclear magnetic resonance (NMR) spectroscopy. The entity engineering system 110 may also use biophysical interaction assays, such as surface plasmon resonance (SPR), isothermal titration calorimetry (ITC), or biolayer interferometry (BLI), to confirm whether the identified residues contribute to target binding.

In some embodiments, the entity engineering system 110 may compare the computationally predicted contact residue regions with experimentally validated binding sites. The entity engineering system 110 may assess the similarity between computational and laboratory-verified residues to refine the identification process. The entity engineering system 110 may adjust the contact residue selection criteria based on feedback from laboratory validation data to improve accuracy in subsequent humanized sequence evaluations.

In some embodiments, the entity engineering system 110 may store the identified contact residue regions in a data store 125 for use in downstream optimization processes. The identified contact residues may be used as preservation constraints in affinity maturation and sequence refinement stages. The preservation of contact residue regions may help maintain target binding specificity while allowing for sequence modifications in non-contact regions to improve manufacturability, stability, and therapeutic efficacy.

In some embodiments, the entity engineering system 110 may input 470 the humanized intermediate candidate sequence and the one or more contact residue regions into a deep neural network to generate a set of one or more improved humanized candidate sequences that have higher affinity than the protein sequence to the drug target molecule. The entity engineering system 110 may use the identified contact residue regions as preservation constraints to ensure that critical binding interactions with the drug target molecule remain unchanged while optimizing the surrounding sequence regions for enhanced affinity.

In some embodiments, the entity engineering system 110 may define contact residue regions that remain unchanged during affinity improvement. The entity engineering system 110 may restrict sequence modifications to non-contact residues to allow optimization while preserving the functional binding interface. The entity engineering system 110 may implement constraint-based optimization, wherein amino acid substitutions are proposed only in regions outside the identified contact residue regions.

In some embodiments, the entity engineering system 110 may establish preservation constraints that include features of the contact residue regions. The preservation constraints may specify that modifications to the contact residues are either completely restricted (e.g., hard constraints) or allowed only within a predefined extent (e.g., soft constraints). The entity engineering system 110 may iteratively adjust candidate sequences based on both affinity and humanization scores, ensuring that modifications do not introduce destabilizing effects or reduce target specificity.

In some embodiments, the entity engineering system 110 may use a transformer-based model trained on antibody sequence databases to predict affinity-enhancing mutations. The entity engineering system 110 may provide the one or more contact residue regions to the transformer-based model as preservation constraints. The transformer-based model may analyze contextual sequence relationships and suggest modifications that enhance binding affinity while maintaining the stability of the humanized sequence.

In some embodiments, the entity engineering system 110 may use a diffusion model to generate incremental sequence modifications. The entity engineering system 110 may iteratively refine the humanized intermediate candidate sequence by introducing small modifications at each step. The iterative refinement may allow the entity engineering system 110 to explore sequence space while ensuring that the optimized sequences maintain manufacturability and therapeutic potential.

In some embodiments, the entity engineering system 110 may employ a reinforcement learning technique to reward affinity while maintaining structural and functional constraints. The reinforcement learning framework may implement a reward-based learning mechanism, prioritizing sequence modifications that improve affinity while penalizing modifications that disrupt the preserved binding interactions. The reinforcement learning approach may iteratively refine candidate sequences by evaluating binding outcomes and adjusting modifications based on predicted structural stability and manufacturability.

In some embodiments, the entity engineering system 110 may store the generated set of improved humanized candidate sequences in a data store 125. The entity engineering system 110 may assign confidence scores to each candidate sequence based on predicted affinity, structural stability, and manufacturability. The entity engineering system 110 may rank the improved humanized candidate sequences and select top-ranked sequences for further validation. The selected sequences may be processed in subsequent laboratory verification steps to confirm binding affinity and therapeutic suitability.

In some embodiments, the entity engineering system 110 may output 475 the set of one or more improved humanized candidate sequences for verification of affinity with the drug target molecule. The entity engineering system 110 may transmit the improved humanized candidate sequences to one or more analytics devices 115 for experimental validation. The verification process may involve assessing binding affinity, structural stability, manufacturability, and immunogenicity to confirm that the computationally optimized sequences retain therapeutic functionality.

The verification may be conducted in laboratory or in silico using known crystallography structures and molecular modelling of variant sequences in the context of that known 3D structure. Assessment of humanization could be an alternative test performed in the laboratory using an immunogenicity assay, such as with the goal in reduced immunogenicity with maintenance of affinity for target.

In some embodiments, the entity engineering system 110 may prepare the improved humanized candidate sequences for laboratory validation by formatting them into a structured dataset. The dataset may include sequence metadata, predicted binding scores, structural modeling outputs, and confidence metrics derived from computational optimization. The structured dataset may facilitate efficient downstream analysis and selection of candidates for synthesis and experimental testing.

In some embodiments, the entity engineering system 110 may interface with one or more analytics devices 115 to initiate laboratory testing procedures. Laboratory verification may include recombinant expression of the improved humanized candidate sequences, purification of the expressed proteins, and biochemical characterization. The entity engineering system 110 may facilitate laboratory experiments using biophysical assays such as surface plasmon resonance (SPR), isothermal titration calorimetry (ITC), and biolayer interferometry (BLI) to quantify binding affinity to the drug target molecule.

In some embodiments, the entity engineering system 110 may process laboratory-generated data and compare experimental results with computational predictions. The entity engineering system 110 may analyze discrepancies between predicted and observed affinity values and assess whether the optimized sequences maintain their expected structural integrity. The entity engineering system 110 may identify candidates that exhibit high binding affinity, structural stability, and manufacturability, prioritizing them for further development.

In some embodiments, the entity engineering system 110 may integrate feedback from laboratory validation into its predictive modeling pipeline. The entity engineering system 110 may use laboratory-verified binding affinity data to refine machine learning models used in affinity optimization. The entity engineering system 110 may iteratively improve future humanized candidate sequence generation by incorporating validated experimental outcomes into the training data of its deep neural networks.

In some embodiments, the entity engineering system 110 may facilitate downstream decision-making by ranking the improved humanized candidate sequences based on laboratory test results. The entity engineering system 110 may identify the top-performing candidates that demonstrate optimal binding affinity, stability, and manufacturability. The selected candidates may be advanced for further preclinical and clinical development as potential therapeutic agents.

Engineering Considerations

Figure 5A:
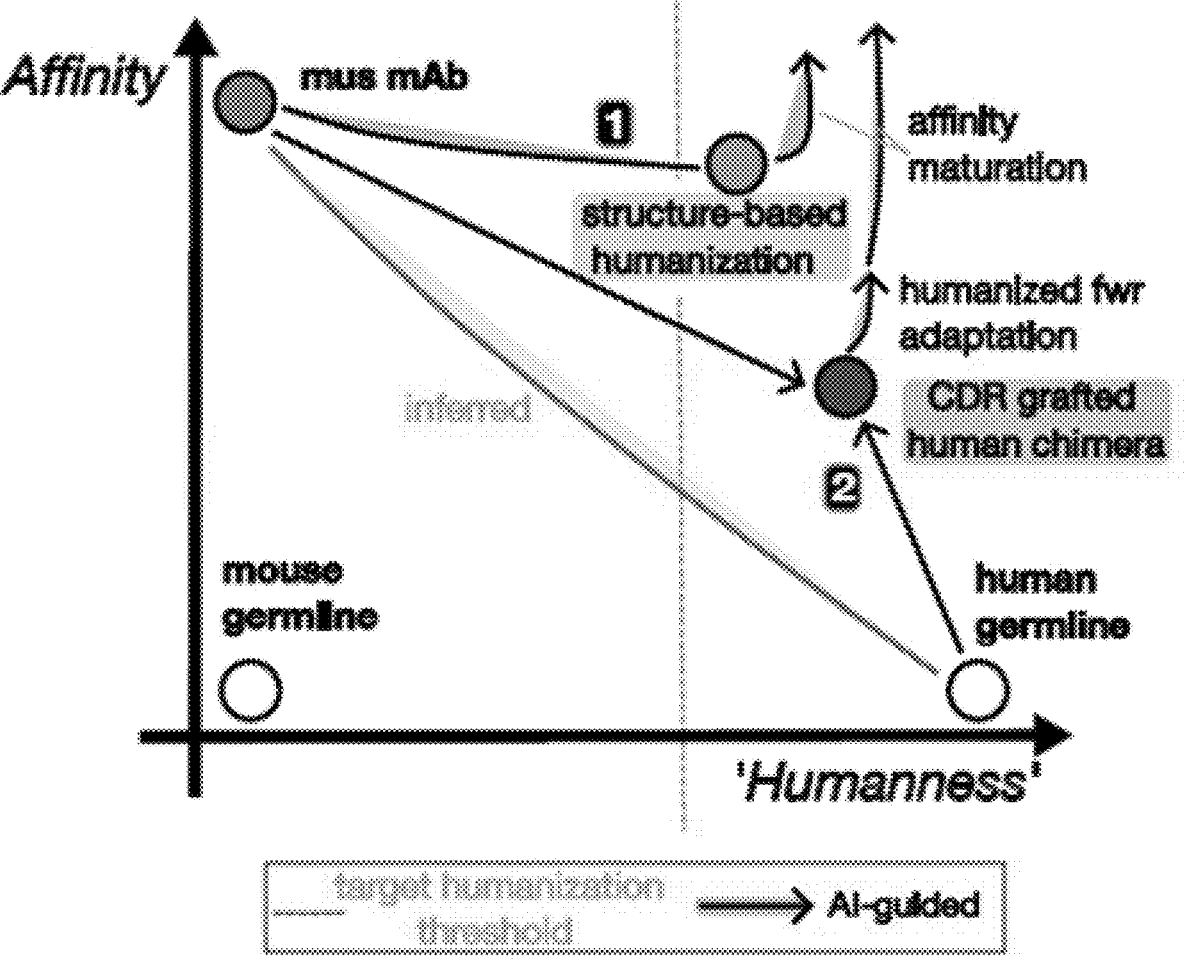
FIG. 5A is a conceptual diagram illustrating an example graph that explains various considerations in engineering an entity, in accordance with some embodiments.

FIG. 5A is a conceptual diagram illustrating an example graph that explains various considerations in engineering an entity, in accordance with some embodiments. In some embodiments, an entity engineering system 110 may perform structure-based humanization of antibody sequences by machine-learning based affinity engineering techniques to preserve affinity while introducing human-like structural modifications. The system may receive an initial non-human monoclonal antibody (mus mAb) sequence and infer an optimal set of humanizing mutations that minimize structural perturbations. The entity engineering system 110 may identify structurally conserved regions within the framework and select humanization mutations that retain binding specificity and stability.

In some embodiments, the entity engineering system 110 may perform antibody humanization by optimizing the balance between affinity and humanness. A humanization process may be represented in a coordinate space where affinity is plotted along a first axis (e.g., y axis) and humanness is plotted along a second axis (e.g., x axis). A starting antibody sequence, such as a mouse monoclonal antibody (mus mAb), may be positioned at a region with high affinity and low humanness. The entity engineering system 110 may apply different humanization methodologies to modify the sequence, including a structure-based humanization approach and a complementarity-determining region (CDR) grafting approach.

In some embodiments, the entity engineering system 110 may apply structure-based humanization by introducing structurally conservative mutations that increase humanness while maintaining affinity, such as using sequence humanization stage 320 discussed in FIG. 3. The structure-based humanization may generate an intermediate candidate positioned closer to a human germline reference along the humanness axis while minimizing loss along the affinity axis. Alternatively, or additionally, the entity engineering system 110 may apply a CDR grafting approach, in which CDRs of a non-human antibody are transferred onto a human germline framework. The CDR grafting approach may generate a humanized framework-adapted sequence, which may require further affinity maturation.

In some embodiments, the entity engineering system 110 may perform an affinity maturation stage 340 to optimize binding interactions of a humanized sequence. The affinity maturation may increase affinity while preserving modifications introduced during the humanization process. The entity engineering system 110 may determine an optimal trajectory for affinity restoration, selecting mutations that improve target binding while maintaining manufacturability constraints.

In some embodiments, the entity engineering system 110 may employ a machine-learning based optimization process to determine an improved pathway for antibody humanization. The entity engineering system 110 may analyze inferred humanization pathways and select mutations that optimize affinity retention while achieving humanness thresholds. A machine-learning based pathway may be determined based on machine learning models trained on antibody sequence datasets, structural predictions, and empirical validation data. The entity engineering system 110 may define a target humanization threshold as a benchmark for evaluating whether a humanized sequence meets predefined criteria for similarity to human germline antibodies.

Figure 5B:
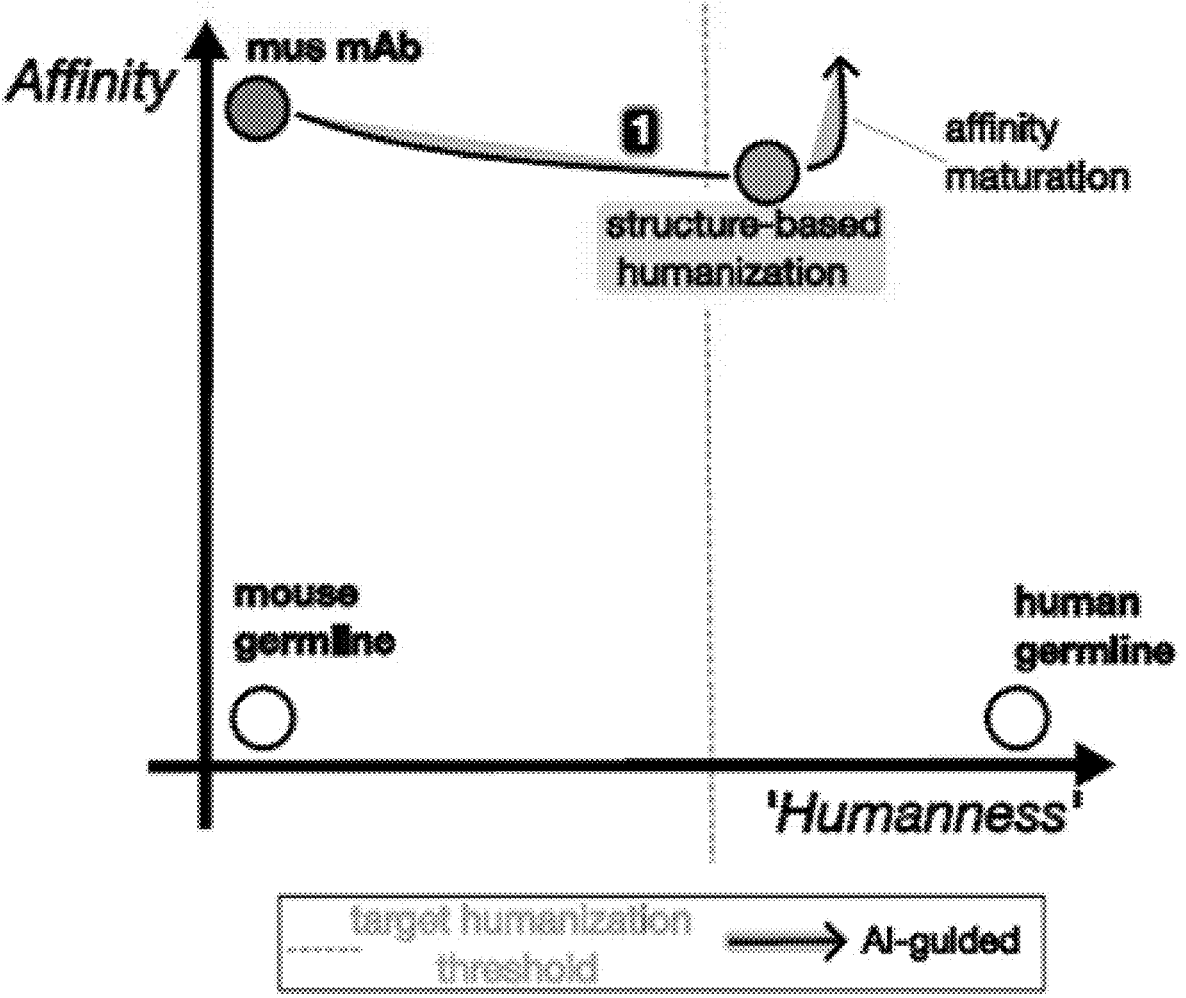
FIG. 5B is a conceptual diagram illustrating a structural-based humanization approach, in accordance with some embodiments.

FIG. 5B is a conceptual diagram illustrating a structural-based humanization approach, in accordance with some embodiments. The entity engineering system 110 may perform structure-based humanization of an antibody sequence to increase humanness while minimizing loss of affinity. A non-human monoclonal antibody (mus mAb) may be positioned at an initial location with high affinity and low humanness. The structure-based humanization may introduce humanizing mutations in framework regions that are structurally conserved to ensure that modifications retain functional integrity. The entity engineering system 110 may apply machine-learning based selection to determine an optimized set of humanizing mutations, selecting substitutions that maintain stability and target-binding properties.

In structure-based humanization, the entity engineering system 110 may introduce structurally conservative mutations that minimize affinity loss while increasing sequence similarity to human germline frameworks. The entity engineering system 110 may apply machine-learning based selection techniques to identify the most functionally tolerant combination of humanizing mutations. The machine-learning based process may evaluate multiple potential substitutions and determine a subset of mutations that optimize compatibility with human immune recognition while preserving antigen-binding properties. In some embodiments, the entity engineering system 110 may implement various mutation proposal strategies to refine the humanization process. Mutations may be inferred using sequence alignment techniques, structural modeling approaches, or machine learning-based predictive frameworks. The entity engineering system 110 may integrate multiple mutation prediction methods and apply scoring mechanisms to rank candidate substitutions based on the substitutions' impact on stability, affinity, and manufacturability.

In some embodiments, the entity engineering system 110 may integrate a language model-based inference mechanism to predict structurally compatible human frameworks by leveraging learned representations of antibody sequence-to-structure relationships. The entity engineering system 110 may optimize framework adaptation by computationally assessing the energetic stability and binding affinity of candidate humanized antibodies. In some embodiments, affinity maturation techniques may be applied to refine framework adaptation through iterative sequence modifications, ensuring that antigen specificity and binding strength are maintained or enhanced following humanization.

In some embodiments, the entity engineering system 110 may establish a target humanization threshold representing a predefined benchmark for human sequence similarity. The entity engineering system 110 may determine whether the humanized candidate satisfies the threshold based on sequence alignment metrics, structural modeling, or manufacturability criteria. The machine-learning based pathway may enable the entity engineering system 110 to achieve humanization objectives while optimizing antibody functionality.

Figure 5C:
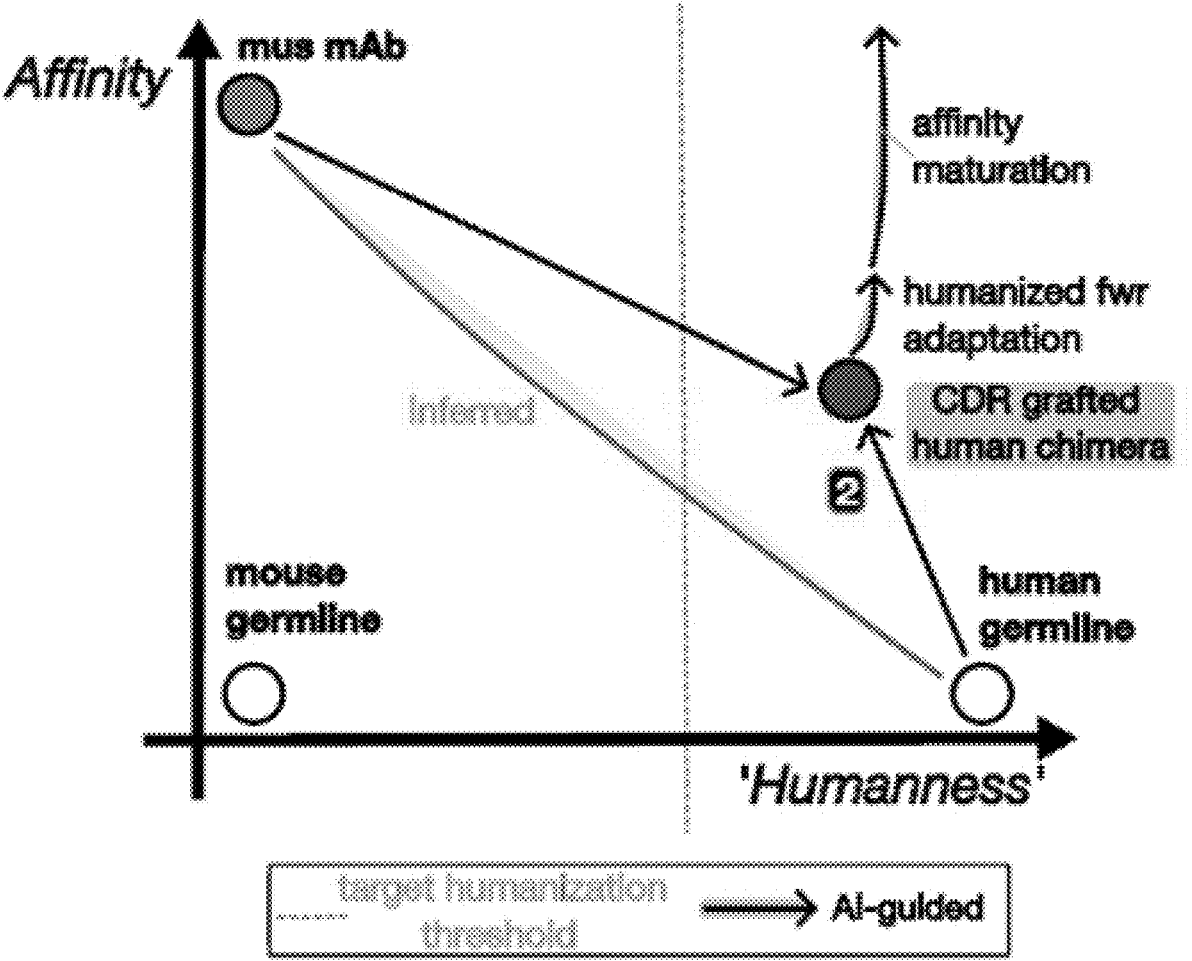
FIG. 5C is a conceptual diagram illustrating a CDR grafting approach, in accordance with some embodiments.

FIG. 5C is a conceptual diagram illustrating a CDR grafting approach, in accordance with some embodiments. In some embodiments, an entity engineering system 110 may maximize humanness while maintaining antigen specificity by performing a CDR grafting process. The entity engineering system 110 may identify a non-human monoclonal antibody (e.g., mus mAb) sequence and determine a suitable human germline framework for grafting complementarity-determining regions (CDRs).

The selection of a compatible germline framework may be performed using machine-learning based inference techniques, which analyze structural and functional constraints to optimize compatibility. The entity engineering system 110 may generate a humanized framework-adapted sequence that retains antigen-binding properties while achieving an increased level of humanness.

In some embodiments, the entity engineering system 110 may address challenges in germline framework selection by applying machine learning models to infer optimal frameworks in silico. The entity engineering system 110 may utilize a language model (LM) trained on antibody sequence data to predict human germline frameworks that provide structural compatibility for the grafted CDRs. The inference model may incorporate structural constraints to ensure that the selected framework preserves the global conformation of the antibody while minimizing disruptions to antigen-binding interactions.

In some embodiments, the entity engineering system 110 may assume that structure-function mapping principles govern the humanization process. The system may predict that an optimal human framework does not alter the global structure of the antibody, allowing CDR grafting to maintain functional integrity. Structural modeling techniques may be applied to validate that the humanized framework maintains native-like folding patterns and antigen interaction characteristics.

In some embodiments, the entity engineering system 110 may further improve the humanized sequence through an affinity maturation process. The affinity maturation process may introduce targeted modifications that enhance binding affinity while ensuring manufacturability and stability. The machine-learning based pathway may refine mutation selection based on predicted structural compatibility and empirical validation data, ensuring that humanized candidates achieve both high affinity and an increased degree of humanness.

EXAMPLES

In some embodiments, an entity engineering system 110 may generate humanized antibodies while preserving structural integrity and antigen-binding affinity. In one example, a non-human monoclonal antibody (mouse Ab) was humanized by grafting complementarity-determining regions (CDRs) onto a human germline framework to produce a chimeric human monoclonal antibody. The humanized antibody was subsequently subjected to affinity maturation to optimize binding strength. Structural analysis demonstrated that the resulting affinity-matured chimeric human antibody exhibited a sub-0.5 Å all-atom root mean square deviation (RMSD) when compared to the parental antibody and intermediate humanized constructs, indicating successful humanization with conserved structural properties.

In some embodiments, the entity engineering system 110 may perform pairwise sequence identity analysis to quantify the similarity between humanized candidates and parental antibody sequences. In one example, the variable heavy (VH) domain of the affinity-matured chimeric human antibody exhibited a sequence identity of 0.75 relative to the parental sequence, while the variable light (VL) domain exhibited a sequence identity of 0.82. Additional analysis demonstrated that naive retrieval of candidate human germline templates for CDR grafting enabled recovery of 93-98% of the parental antibody's original binding affinity. The entity engineering system 110 may further refine human template selection through machine-learning based inference techniques to optimize framework compatibility.

In some embodiments, the entity engineering system 110 may identify human germline frameworks by analyzing germline content percentages in engineered antibody candidates. In one example, a successfully humanized antibody contained an IGHV1-46*01 heavy chain framework with 64% human germline content and an IGKV4-1*01 light chain framework with 77% human germline content. Similarly, inference of candidate germline sequences for another engineered antibody, FMC63, identified an IGHV4-30-4*01 heavy chain framework with 63% human germline content and an IGKV1-39*01 light chain framework with 74% human germline content. The entity engineering system 110 may implement large-scale paired germline selection strategies in silico to enhance humanization accuracy.

In some embodiments, the entity engineering system 110 may assess structural alignment and antigen-binding properties of humanized antibody candidates through predictive modeling and empirical validation. In one example, the entity engineering system 110 generated structural models of a humanized FMC63 antibody and evaluated its predicted binding complex with the CD19 antigen. AlphaFold-based structural predictions demonstrated high accuracy in modeling framework regions, while CDR loops and antigen-binding orientations required further refinement. An overlay analysis comparing three humanized antibody structures with the experimentally determined CD19 binding orientation confirmed that the AI-generated models preserved key structural features necessary for antigen recognition.

In some embodiments, the entity engineering system 110 may incorporate experimental validation data to improve predictive modeling accuracy. In one example, humanized antibodies with greater than 94% sequence identity to known mature human antibodies were identified, confirming that machine-learning based humanization methods produce therapeutically relevant candidates. The entity engineering system 110 may iteratively refine its predictive algorithms by incorporating crystallographic and binding assay data, enabling the generation of optimized antibody therapeutics with improved manufacturability, stability, and binding affinity.

Example Transformer Model

Figure 6:
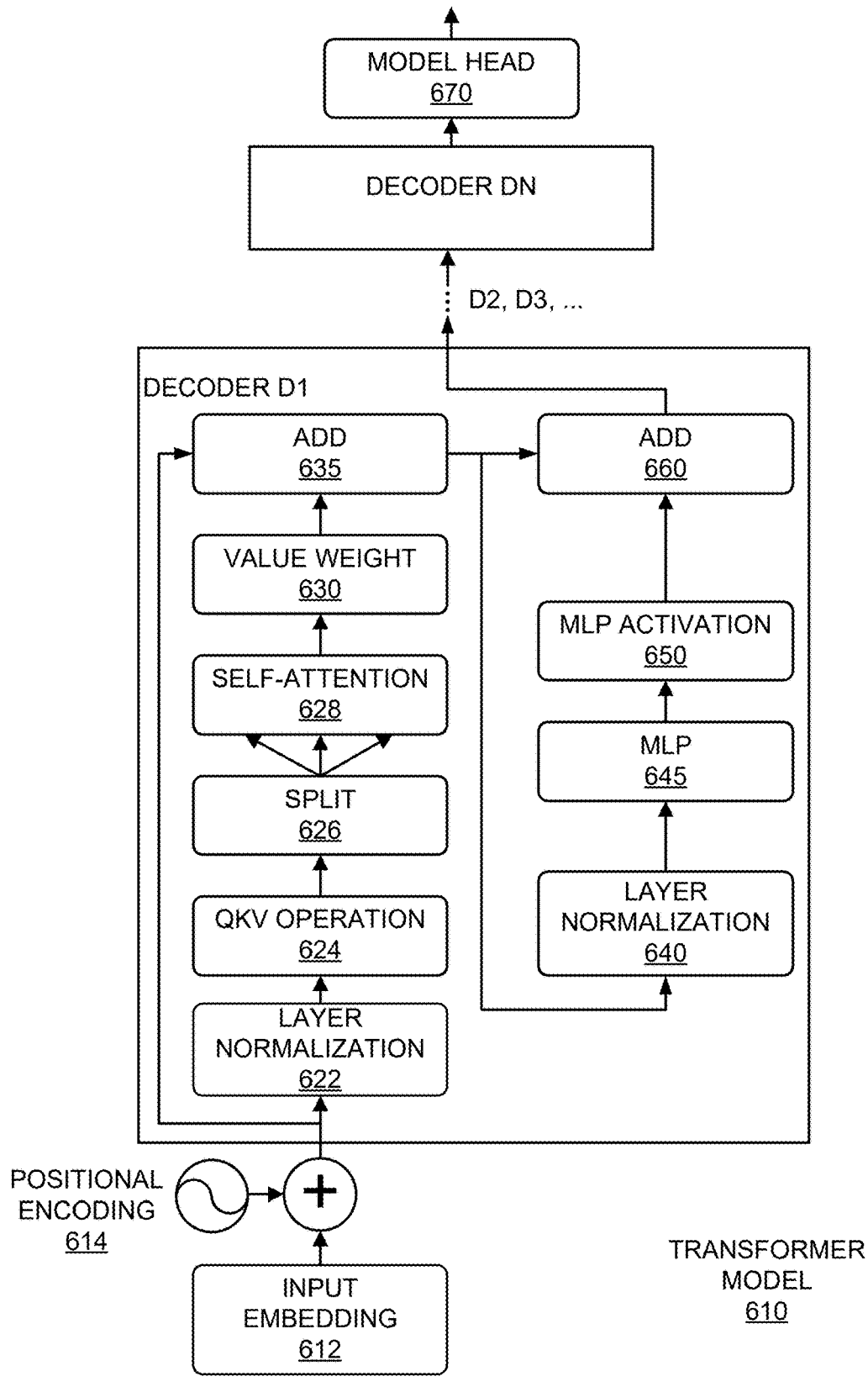
FIG. 6 is a conceptual diagram of functional blocks of a transformer-based neural network model, in accordance with some embodiments.

FIG. 6 is a conceptual diagram of functional blocks of a transformer-based neural network model 610, in accordance with some embodiments. For simplicity, the transformer-based neural network model 610 is referred to as a transformer model 610. The transformer model 610 is an example of a machine learning model that is discussed in conjunction with FIG. 1 through FIG. 5C. An actual transformer model 610 may be a large language model that involves numerous neurons, such as a large number of decoders, and a large number of parameters. The structure illustrated in FIG. 6 is part of a decoder for generating token attention. In a language processing task, the input may take the form of a sequence of words (e.g., a prompt) that may be encoded to a sequence of input tokens. For an affinity maturation sequence optimization task, the input may take the form of a string sequence or any suitable input as discussed in step 410 in conjunction with FIG. 4A. Each token may represent a respective embedding in a latent space. Based on the input tokens, the transformer model 610 may repeatedly generate a sequence of output tokens in an autoregressive manner.

In some embodiments, a transformer model 610 includes a set of N decoders, D1, D2, . . . , and DN. A decoder receives a set of input representations and generates a set of output representations. For example, the first decoder D1 generates a set of output representations. Each subsequent decoder may receive the set of output representations of a previous decoder and generate another set of output representations. For example, the second decoder D2 placed after the first decoder D1 may receive the set of output representations generated by the first decoder D1, and generate another set of output representations. This process is repeated until the set of output representations for the final decoder is generated. The representations in each decoder may be latent representations that may or may not correspond to any real-world concepts. In some embodiments, some of the decoders may correspond to analyzing data dimensions that correspond to various types of data that are used to generate target-compatible sequence modifications, such as sequence embeddings, structural compatibility scores, and association score predictions.

The transformer model 610 may include a model head block 670 that receives the set of output representations from the final decoder DN and generates an output token as the output for the current iteration.

As shown in FIG. 6, a decoder in the transformer model 610 includes a first layer normalization block 622, a query-key-value (QKV) operation block 624, a split block 626, a self-attention block 628, a value weight block 630, a first add block 635, a second layer normalization block 640, a multi-layer perceptron (MLP) block 645, an MLP activation block 650, and a second add block 660. In some embodiments, the computations in one or more blocks in the decoder are managed by the central simulation system 110. While the operations in the first decoder D1 are described as an example, the remaining decoders in the set may include similar operations as the first decoder D1.

FIG. 6 illustrates a flow for the attention mechanism of a transformer model 610. The transformer model 610 receives an input sequence, such as a candidate entity sequence for affinity maturation optimization. Each symbol may be converted into a token that takes the form of an embedding vector. The sequence of symbols may be represented as a matrix of embedding vectors with each embedding vector being arranged in a row of the matrix. The layer normalization block 622 receives an input dataset (e.g., the matrix of embedding vectors) and normalizes the data values to generate a normalized dataset (e.g., a normalized matrix).

The QKV operation block 624 receives the normalized input dataset and performs three separate projections to respectively generate a query matrix, a key matrix, and a value matrix. Specifically, the QKV operation may apply a QKV weight matrix, which is a trained set of parameters of the transformer model 610, to the normalized dataset. The operation may include a matrix multiplication between a weight matrix and the normalized input dataset. The QKV operation may model sequence dependencies and structure-function relationships.

The split block 626 may split the output of the QKV operation block 624 into a query matrix, a key matrix, and a value matrix. The self-attention block 628 receives the query matrix, the key matrix, and the value matrix as the inputs and generates an attention matrix. The generation of an attention matrix includes multiplying the query matrix and a transposed version of the key matrix. In generating attention scores, a softmax operation to each row of the attention matrix may be applied. In some embodiments, the softmax operation converts the logit scores into probabilistic weighting factors that determine relative sequence importance. Conceptually, the attention score may be represented by the equation attention=softmax (Q*K/Scale). Context-aware token weighting allows the transformer model 610 to prioritize sequence modifications that improve association scores while preserving interaction sites.

The value weight block 630 receives data related to the attention score and generates an attention dataset. The output for each token is a weighted combination of value vectors with the weights given by the attention scores determined in the self-attention block 628. The outputs of the value weight block 630 may be computed by a matrix multiplication between the value matrix and the attention matrix after softmax is applied. The add block 635 concatenates results from various layers. The results of the attention sublayer, including results from add block 635, may be further normalized using the second layer normalization block 640.

A decoder may include one or more multi-layer perceptron (MLP) blocks 645 that include additional neural network layers, which may take the form of feed-forward fully connected layers. One or more MLP blocks 645 may include an MLP activation block 650. In some embodiments, an MLP activation block 650, which typically includes a non-linear activation function, may be nestled between two linear MLP blocks 645. The MLP blocks 645 along with the MLP activation block 650 may be used to introduce non-linearity, perform feature extraction, reduce dimensionality, and select tokens for the next decoder. In some embodiments, the activation function used in the MLP activation block 650 may be any suitable activation function such as a sigmoid function, a hyperbolic tangent function (tanh), a rectified linear unit function (ReLU), or a Gaussian Error Linear Unit function (GeLU). Outputs of the MLP blocks may be further concatenated in the add block 660.

The output of the first decoder D1 is passed to a subsequent decoder. This process is repeated until the set of output data from the final decoder DN is generated. While each decoder may involve similar operations as the first decoder D1, the trained set of parameter values that are associated with the operations may be different from decoder to decoder. The model head block 670 receives output from the final decoder DN to determine an output token. Additional softmax operation may be performed at LM head block 670 to determine the final attention scores. The LM head block 670 may select the next token.

Example Model Training and Distillation

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN), long short-term memory networks (LSTM), transformers, and linear recurrent neural networks such as Mamba may also be used. For example, various structural-based adaptation predictions performed by a sequence optimization module, CDR grafting optimizations performed by a target-compatible selection module, and affinity maturation enhancements performed by an association score refinement module may apply one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to identify optimal sequence modifications for structural-based adaptation, the training samples may be known sequence pairs with experimentally validated target-compatible substitutions. The labels for each training sample may be binary or multi-class. In training a machine learning model for CDR grafting optimization, the training labels may include a positive label that indicates successful target-compatible sequence grafting with preserved functional engagement and a negative label that indicates disruptions in functional engagement due to sequence modifications. In some embodiments, the training labels may also be multi-class such as different levels of structural stability and sequence compatibility scores.

By way of example, the training set may include multiple past records of entity sequences mapped to their respective structural and functional validation data. Each training sample in the training set may correspond to a past sequence modification experiment, and the corresponding outcome may serve as the label for the sample. A training sample may be represented as a feature vector that includes multiple dimensions. Each dimension may include data of a feature, which may be a quantized value of an attribute that describes sequence similarity scores, structural conformation data, or functional engagement metrics. For example, in a machine learning model that is used to predict association score-enhancing modifications in affinity maturation, the features in a feature vector may include binding interface conservation scores, predicted interaction energy, structural compatibility indices, etc. In various embodiments, certain pre-processing techniques may be used to normalize the values in different dimensions of the feature vector.

In some embodiments, an unsupervised learning technique may be used. The training samples used for an unsupervised model may also be represented by feature vectors but may not be labeled. Various unsupervised learning techniques such as clustering may be used in determining similarities among the feature vectors, thereby categorizing the training samples into different clusters. In some cases, the training may be semi-supervised with a training set having a mix of labeled samples and unlabeled samples.

A machine learning model may be associated with an objective function, which generates a metric value that describes the objective goal of the training process. The training process may intend to reduce the error rate of the model in generating predictions. In such a case, the objective function may monitor the error rate of the machine learning model. In a model that generates predictions, the objective function of the machine learning algorithm may be the training error rate when the predictions are compared to the actual labels. Such an objective function may be called a loss function. Other forms of objective functions may also be used, particularly for unsupervised learning models whose error rates are not easily determined due to the lack of labels. In some embodiments, in optimizing entity sequences for improved association scores, the objective function may correspond to minimizing structural destabilization while maximizing interaction strength at binding interfaces. In various embodiments, the error rate may be measured as cross-entropy loss, L1 loss (e.g., the sum of absolute differences between the predicted values and the actual value), or L2 loss (e.g., the sum of squared distances).

Figure 7:
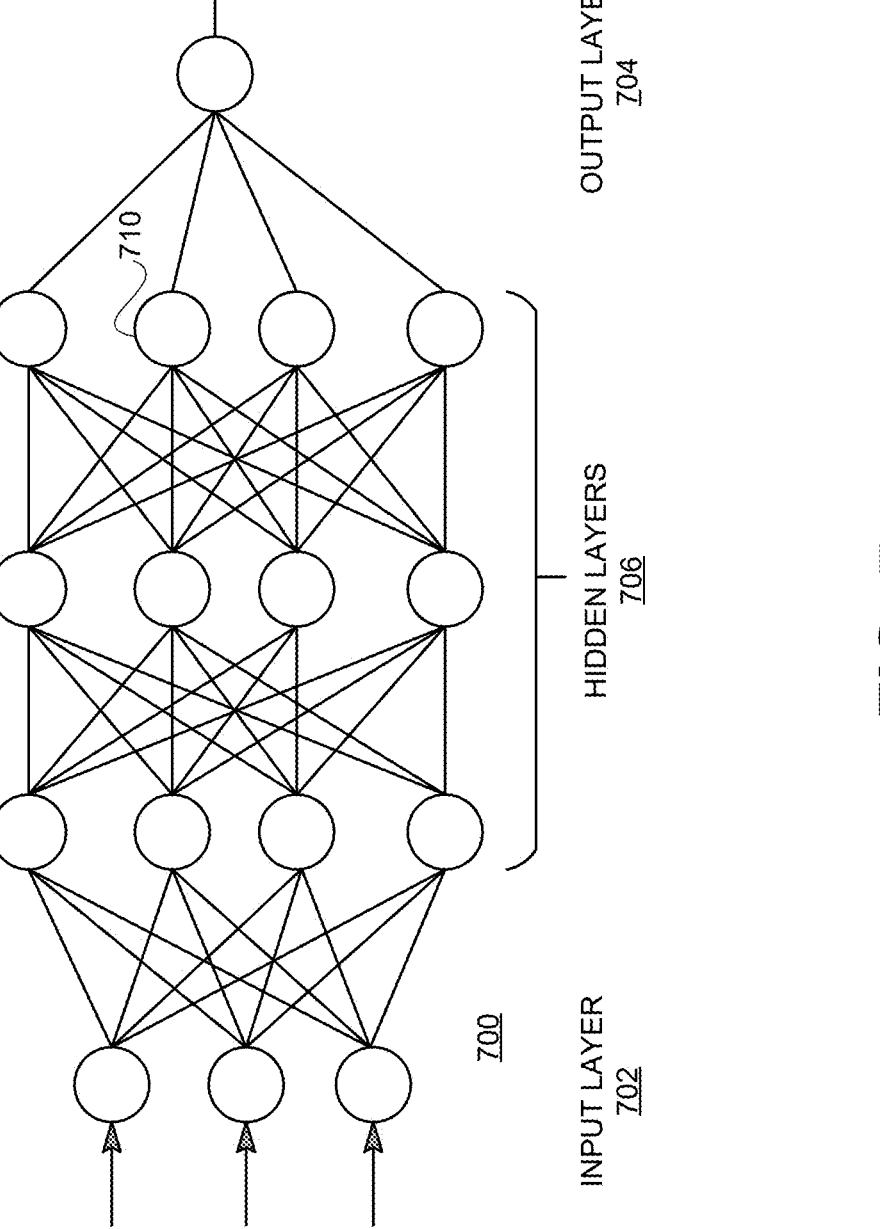
FIG. 7 is a conceptual diagram illustrating a structure of an example neural network, in accordance with some embodiments.

Referring to FIG. 7, a structure of an example neural network is illustrated, in accordance with some embodiments. The neural network 700 may receive an input and generate an output. The input may be the feature vector of a training sample in the training process and the feature vector of an actual case when the neural network is making an inference. The output may be the prediction, classification, or another determination performed by the neural network. The neural network 700 may include different kinds of layers, such as convolutional layers, pooling layers, recurrent layers, fully connected layers, and custom layers.

Training of a neural network, such as the neural network 700, may include forward propagation and backpropagation. Each layer in a neural network may include one or more nodes, which may be fully or partially connected to other nodes in adjacent layers. In forward propagation, the neural network performs the computation in the forward direction based on the outputs of a preceding layer. The operation of a node may be defined by one or more functions. The functions that define the operation of a node may include various computation operations such as convolution of data with one or more kernels, pooling, recurrent loops in RNNs, and transformer-based self-attention mechanisms.

Training of a machine learning model may include an iterative process that includes iterations of making determinations, monitoring the performance of the machine learning model using the objective function, and backpropagation to adjust the weights (e.g., weights, kernel values, coefficients) in various nodes 710. For example, a computing device may receive a training set that includes historical sequence modifications and their associated association scores. Each training sample in the training set may be assigned with labels indicating successful or unsuccessful structural compatibility following sequence modifications. The computing device, in forward propagation, may use the machine learning model to generate predicted association scores for new sequence modifications. The computing device may compare the predicted association scores with the labels of the training sample. The computing device may adjust, in a backpropagation step, the weights of the machine learning model based on the comparison. The computing device backpropagates one or more error terms obtained from one or more loss functions to update a set of parameters of the machine learning model.

By way of example, each of the functions in the neural network may be associated with different coefficients (e.g., weights and kernel coefficients) that are adjustable during training. Additionally, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other samples in the training sets to compute the value of the objective function in a particular training round.

Multiple rounds of forward propagation and backpropagation may be performed. Training may be completed when the objective function has become sufficiently stable (e.g., the machine learning model has converged) or after a predetermined number of rounds for a particular set of training samples. The trained machine learning model can be used for performing structural-based adaptation, CDR grafting optimization, affinity maturation, or another suitable task for which the model is trained.

In various embodiments, the training samples described above may be refined and continue to re-train the model, which improves the model's ability to perform inference tasks. In some embodiments, this training and re-training process may repeat, resulting in a computer system that continues to improve its functionality through the use-retraining cycle. For example, after the model is trained, multiple rounds of re-training may be performed. The process may include periodically retraining the machine learning model. The periodic retraining may include obtaining an additional set of training data, such as through other sources, by usage of users, and by using the trained machine learning model to generate additional samples. The additional set of training data and later retraining may be based on updated data describing updated parameters in training samples. The process may also include applying the additional set of training data to the machine learning model and adjusting parameters of the machine learning model based on the application of the additional set of training data. The additional set of training data may include structural compatibility scores, association score predictions, interaction site conservation data, and functional engagement metrics to further enhance structural-based adaptation, CDR grafting, and affinity maturation.

In some embodiments, model distillation may be used to transfer knowledge from a trained model to another model with reduced complexity while maintaining similar predictive performance. A trained model, often referred to as a teacher model, may generate outputs such as logits, confidence scores, or probability distributions over possible predictions. These outputs may serve as soft labels for training a student model, which typically has fewer parameters or a more efficient architecture. The student model may learn to approximate the teacher model's decision boundary by minimizing the difference between its own predictions and the teacher model's outputs. This process may involve loss functions such as Kullback-Leibler (KL) divergence or cross-entropy loss with temperature scaling to ensure that the student model effectively captures the patterns and representations learned by the teacher model.

In some embodiments, model distillation may be performed using different techniques depending on the level of knowledge transfer between the teacher and student models. One common approach is logit-based distillation, where the student model learns from the soft probability distributions produced by the teacher model instead of hard class labels. The temperature parameter in the softmax function may be adjusted to smooth the probability distribution, allowing the student model to capture subtle relationships between classes. Another approach is feature-based distillation, where intermediate feature representations from the teacher model are used to guide the student model's learning process. In this method, layer activations, embeddings, or attention maps from the teacher model may be matched with corresponding layers in the student model to enforce structural similarity. Additionally, response-based distillation may be used, where the teacher model's decisions, such as classification outputs or ranking scores, are directly used to supervise the student model. In some cases, hybrid approaches may combine multiple distillation techniques to optimize both predictive accuracy and model efficiency. By selecting an appropriate distillation strategy, a system may tailor knowledge transfer to specific tasks and deployment constraints.

In some embodiments, model distillation may be applied in scenarios where computational efficiency is a priority, such as deploying models on edge devices, mobile applications, or cloud environments with resource constraints. The distilled student model may inherit the generalization ability of the teacher model while reducing memory footprint and inference latency. In some cases, multiple teacher models may be used to provide diverse outputs, allowing the student model to integrate knowledge from different sources. The distillation process may also incorporate additional regularization techniques, such as weight pruning or quantization, to further optimize the student model's efficiency. By leveraging model distillation, a system may achieve a balance between model performance and computational efficiency, enabling scalable deployment across various machine learning applications.

Computing Machine Architecture

Figure 8:
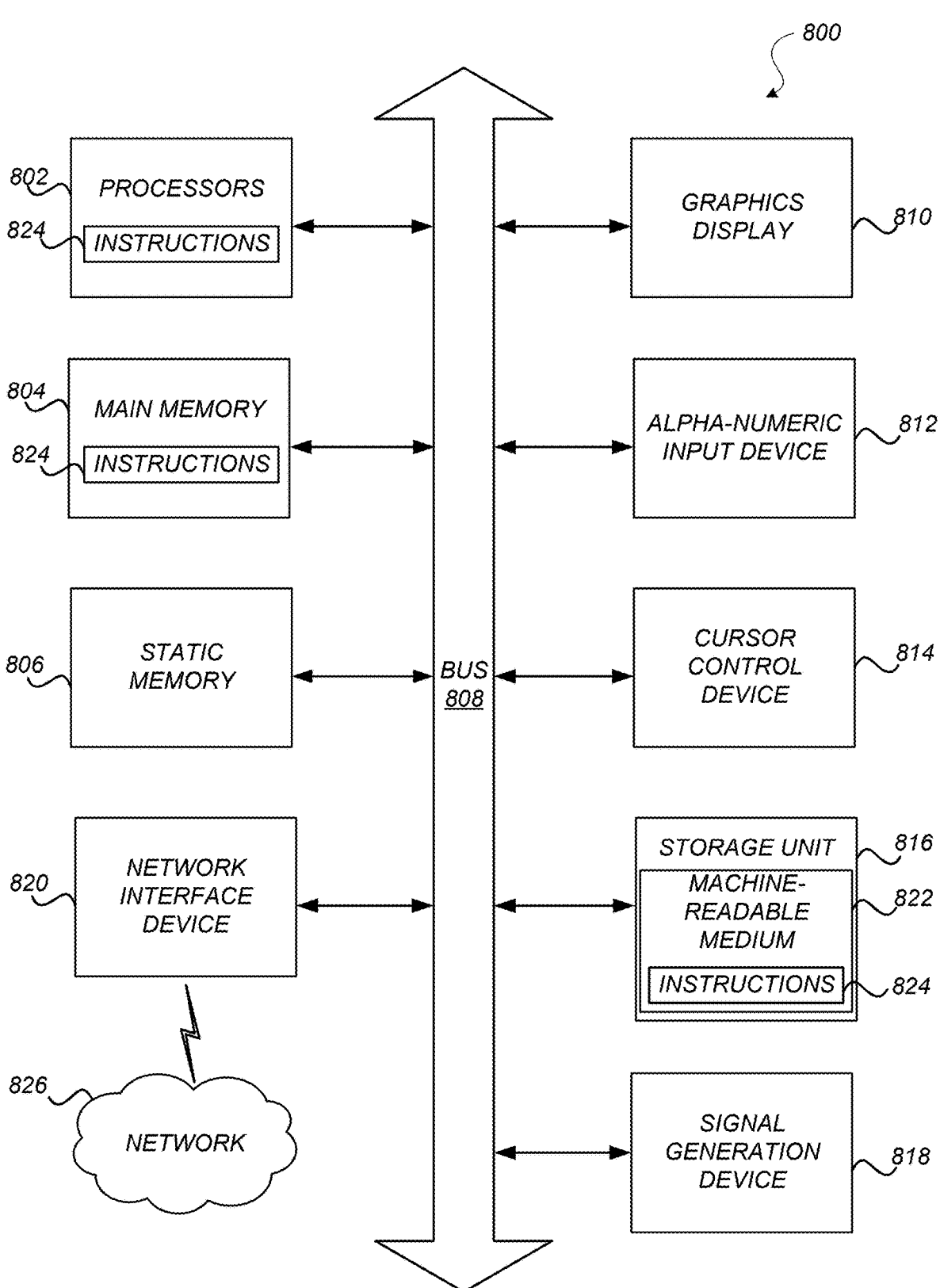
FIG. 8 is a block diagram illustrating components of an example computing machine, in accordance with some embodiments.

FIG. 8 is a block diagram illustrating components of an example computing machine that is capable of reading instructions from a computer-readable medium and executing them in a processor (or controller). A computer described herein may include a single computing machine shown in FIG. 8, a virtual machine, a distributed computing system that includes multiple nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1 and 2. While FIG. 8 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IOT) device, a switch or bridge, or any machine capable of executing instructions 824 that specify actions to be taken by that machine. Further, while only a single machine is illustrated, the terms "machine" and "computer" may also be taken to include any collection of machines that individually or jointly execute instructions 824 to perform any one or more of the methodologies discussed herein.

The example computer system 800 includes one or more processors 802 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 800 may also include a memory 804 that stores computer code including instructions 824 that may cause the processors 802 to perform certain actions when the instructions are executed, directly or indirectly by the processors 802. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One or more methods described herein improve the operation speed of the processor 802 and reduce the space required for the memory 804. For example, the database processing techniques described herein reduce the complexity of the computation of the processor 802 by applying one or more novel techniques that simplify the steps in training, reaching convergence, and generating results of the processors 802. The algorithms described herein also reduce the size of the models and datasets to reduce the storage space requirement for memory 804.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though the specification or the claims may refer to some processes to be performed by a processor, this may be construed to include a joint operation of multiple distributed processors. In some embodiments, a computer-readable medium comprises one or more computer-readable media that, individually, together, or distributively, comprise instructions that, when executed by one or more processors, cause a processor (including in the situation of one or more processors) to perform, individually, together, or distributively, the steps of the instructions stored on the one or more computer-readable media. Similarly, a processor comprises one or more processors or processing units that, individually, together, or distributively, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situation such as in multiple processors of a system in a chip, in Cloud computing, or in distributed computing.

The computer system 800 may include a main memory 804, and a static memory 806, which are configured to communicate with each other via a bus 808. The computer system 800 may further include a graphics display unit 810 (e.g., a plasma display panel (PDP), a liquid crystal display (LCD), a projector, or a cathode ray tube (CRT)). The graphics display unit 810, controlled by the processor 802, displays a graphical user interface (GUI) to display one or more results and data generated by the processes described herein. The computer system 800 may also include an alphanumeric input device 812 (e.g., a keyboard), a cursor control device 814 (e.g., a mouse, a trackball, a joystick, a motion sensor, or other pointing instruments), a storage unit 816 (a hard drive, a solid-state drive, a hybrid drive, a memory disk, etc.), a signal generation device 818 (e.g., a speaker), and a network interface device 820, which also are configured to communicate via the bus 808.

The storage unit 816 includes a computer-readable medium 822 on which are stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store instructions (e.g., instructions 824). The computer-readable medium may include any medium that is capable of storing instructions (e.g., instructions 824) for execution by the processors (e.g., processors 802) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The disclosed configurations beneficially include a computer-implemented method, including: receiving an entity data sequence that has a majority of regions originating from one or more non-target data sources; replacing windows of data strings of the entity data sequence with target-compatible strings to generate a target-compatible intermediate candidate sequence; identifying one or more data loci in the target-compatible intermediate candidate sequence, wherein the data loci are verifiable from analytical assessments to be regions that interact with a target; inputting the target-compatible intermediate candidate sequence and the one or more data loci into a deep neural network to generate a set of one or more improved target-compatible candidate sequences that have higher association score than the data string to the target, wherein the one or more data loci are inputted as preservation constraints; and outputting the set of one or more improved target-compatible candidate sequences for analytical verification of association score with the target.

In some embodiments, replacing the windows of data strings of the entity data sequence with the target-compatible strings to generate the target-compatible intermediate candidate sequence includes using a lookup-based approach, the lookup-based approach includes: retrieving a database of known target-compatible data strings; identifying sequence windows in the data string that are non-target; mapping a non-target sequence window to a matching target-compatible sequence window based on a similarity threshold; and substituting the non-target sequence window with the corresponding target-compatible sequence window.

In some embodiments, replacing the windows of data strings of the entity data sequence with the target-compatible strings to generate the target-compatible intermediate candidate sequence includes: inputting the data string into a machine learning model that is trained on a dataset of target-compatible and non-target data strings; generating, using the machine learning model, one or more candidate target-compatible sequence windows that are candidates to replace the windows of the data string; scoring the one or more candidate target-compatible sequence windows based on sequence similarity; and substituting one or more windows of the data string with one or more candidate target-compatible sequence windows based on the scoring.

In some embodiments, replacing the windows of data strings of the entity data sequence with the target-compatible strings includes: retrieving a reference set of target-compatible data strings; computing pairwise similarity scores between non-target sequence windows and the reference set; selecting a sequence similarity threshold for viable adaptation candidates; and selecting target-compatible sequence windows that meet the sequence similarity threshold.

In some embodiments, replacing the windows of data strings of the entity data sequence with the target-compatible strings includes: retrieving target-compatible data strings from a curated entity database; identifying pattern elements relevant to a target function; matching a non-target sequence region with the pattern elements based on a similarity in the target function; and substituting the non-target sequence region with one of the pattern elements based on the similarity in the target function.

In some embodiments, identifying one or more data loci in the target-compatible intermediate candidate sequence includes: determining an entity structure of the target-compatible intermediate candidate sequence; computing spatial separation distances between structural elements of the target-compatible intermediate candidate sequence and the target; determining a distance threshold for interaction site determination; and labeling structural elements that fall within the distance threshold as the data loci.

In some embodiments, determining the distance threshold includes: analyzing structural interaction data from known interacted assemblies; establishing an empirical distance range that correlates with functional engagements in the structural interaction data; and determining the threshold based on the empirical distance range.

In some embodiments, inputting the target-compatible intermediate candidate sequence and the one or more data loci into the deep neural network to generate the set of one or more improved target-compatible candidate sequences includes: defining data loci that remain unchanged during association score improvement; restricting sequence modifications to non-interaction residues; and generating the set of one or more improved target-compatible candidate sequences.

In some embodiments, inputting the target-compatible intermediate candidate sequence and the one or more data loci into a deep neural network to generate a set of one or more improved target-compatible candidate sequences includes: establishing the preservation constraints as including a feature of the data loci; allowing limited modification of the data loci within a predefined extent; iteratively adjusting candidate sequences based on both association score and adaptation scores.

In some embodiments, replacing the windows of data strings of the entity data sequence with the target-compatible strings includes: retrieving structural data from structural imaging, ultra-resolution scanning, or computational structure prediction; identifying conserved structural features that are maintained during adaptation; validating target-compatible candidate sequences through structural stability simulations; and selecting candidates that maintain configurational linkage of the data string.

In some embodiments, inputting the target-compatible intermediate candidate sequence and the one or more data loci into the deep neural network to generate the set of one or more improved target-compatible candidate sequences includes: using a transformer-based model trained on interacted assembly databases to predict performance-boosting alterations; providing the one or more data loci to the transformer-based model as the preservation constraints; and generating sequence modifications to the target-compatible intermediate candidate sequence using the transformer-based model.

In some embodiments, inputting the target-compatible intermediate candidate sequence and the one or more data loci into the deep neural network to generate the set of one or more improved target-compatible candidate sequences includes: using a diffusion model to generate incremental sequence modifications; and generating variants by iteratively refining the target-compatible intermediate candidate sequence.

In some embodiments, inputting the target-compatible intermediate candidate sequence and the one or more data loci into the deep neural network to generate the set of one or more improved target-compatible candidate sequences includes: employing a reinforcement learning technique to reward association score while maintaining structural and functional constraints; implementing a reward-based learning that prioritizes rewarding the association score; and generating an improved target-compatible candidate sequence.

In some embodiments, the disclosure described herein relate to a computer-implemented method, further including: collecting experimental validation data on the set of one or more improved target-compatible candidate sequences; feeding back the experimental validation data as model training data; and retaining the deep neural network using the model training data. In some embodiments, the majority of regions of the data string originates from a rodent-derived entity. In some embodiments, the majority of regions of the data string originates from a specialized entity fragment. In some embodiments, the data string is an approved functional entity. In some embodiments, the disclosure described herein relate to a computer-implemented method, further including distilling the deep neural network to generate a second deep neural network using outputs of the deep neural network as training data of the second deep neural network.

In some embodiments, the disclosure described herein relate to a non-transitory computer-readable medium configured to store code including instructions, wherein the instructions, when executed by one or more processors, cause the one or more processors to: receive an entity data sequence that has a majority of regions originating from one or more non-target data sources; replace windows of data strings of the entity data sequence with target-compatible strings to generate a target-compatible intermediate candidate sequence; identify one or more data loci in the target-compatible intermediate candidate sequence, wherein the data loci are verifiable from analytical assessments to be regions that interact with a target; input the target-compatible intermediate candidate sequence and the one or more data loci into a deep neural network to generate a set of one or more improved target-compatible candidate sequences that have higher association score than the data string to the target, wherein the one or more data loci are inputted as preservation constraints; and output the set of one or more improved target-compatible candidate sequences for analytical verification of association score with the target.

In some embodiments, the disclosure described herein relate to a system including: one or more processors; memory for storing code including instructions, wherein the instructions, when executed by the one or more processors, cause the one or more processors to: receive an entity data sequence that has a majority of regions originating from one or more non-target data sources; replace windows of data strings of the entity data sequence with target-compatible strings to generate a target-compatible intermediate candidate sequence; identify one or more data loci in the target-compatible intermediate candidate sequence, wherein the data loci are verifiable from analytical assessments to be regions that interact with a target; input the target-compatible intermediate candidate sequence and the one or more data loci into a deep neural network to generate a set of one or more improved target-compatible candidate sequences that have higher association score than the data string to the target, wherein the one or more data loci are inputted as preservation constraints; and output the set of one or more improved target-compatible candidate sequences for analytical verification of association score with the target.

In some embodiments, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, or storage medium, as well. The dependencies or references in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcodes, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A system, comprising:
a data store configured to store a plurality of protein sequences that originates from one or more non-target data sources that correspond to one or more non-human species;
a computing device comprising memory and one or more processors, the memory storing instructions, wherein the instructions, when executed, cause the one or more processors to:
receive a protein sequence that has a majority of regions originating from the one or more non-target data sources that correspond to the one or more non-human species;
replace windows of the protein sequence with humanized regions to generate a humanized intermediate candidate sequence;
identify one or more contact residue regions in the humanized intermediate candidate sequence, wherein the one or more contact residue regions are verifiable from laboratory tests to be regions that interact with a drug target molecule;
input the humanized intermediate candidate sequence and the one or more contact residue regions into a deep neural network to generate a set of one or more improved humanized candidate sequences that have higher affinity than the protein sequence to the drug target molecule, wherein the one or more contact residue regions are inputted as preservation constraints; and
output the set of one or more improved target compatible humanized candidate sequences to be stored in the data store.

2. The system of claim 1, wherein the instruction to replace the windows of the protein sequence with the humanized regions to generate the humanized intermediate candidate sequence comprises using a lookup-based approach, the lookup-based approach comprises:

retrieving a database of known human protein sequences;

identifying sequence windows in the protein sequence that are non-human;

mapping a non-human sequence window to a matching human sequence window based on a similarity threshold; and substituting the non-human sequence window with a corresponding human sequence window in response to at least meeting the similarity threshold.

3. The system of claim 1, wherein the instruction to replace the windows of protein sequence with the humanized intermediate candidate sequence comprises instructions to:

input the protein sequence into a machine learning model that is trained on a dataset of human and non-human protein sequences;

generate, using the machine learning model, one or more candidate humanized sequence windows that are candidates to replace the windows of the protein sequence;

score the one or more candidate humanized sequence windows based on sequence similarity; and substitute one or more windows of the protein sequence with one or more candidate humanized sequence windows based on the scoring.

4. The system of claim 1, wherein the instruction to replace the windows of protein sequence with the humanized regions comprises instructions to:

retrieve a reference set of human protein sequences;

compute pairwise similarity scores between non-human sequence windows and the reference set;

select a sequence similarity threshold for viable adaptation humanization candidates; and select humanized sequence windows that meet the sequence similarity threshold.

5. The system of claim 1, wherein the instruction to replace the windows of protein sequence with the humanized regions comprises instructions to:

retrieve humanized protein sequences from a curated protein entity database;

identify sequence motifs pattern to a target protein function;

match a non-human sequence region with the sequence motifs based on a similarity in the target protein function; and substitute the non-human sequence region with one of the sequence motifs based on the similarity in the target protein function.

6. The system of claim 1, wherein the instruction to identify one or more contact residue regions in the humanized intermediate candidate sequence comprises instructions to:

determine a protein structure of the humanized intermediate candidate sequence;

compute intermolecular distances between amino acid residues of the humanized intermediate candidate sequence and a drug target molecule;

determine a distance threshold for contact residue site determination; and label amino acid residues that fall within the distance threshold as the contact residue regions.

7. The system of claim 6, wherein the instruction to determine the distance threshold comprises instructions to:

analyze structural interaction data from known antibody-antigen complexes;

establish an empirical distance range that correlates with binding interactions in the structural interaction data; and determine the threshold based on the empirical distance range.

8. The system of claim 1, wherein the instruction to input the humanized intermediate candidate sequence and the one or more contact residue regions into the deep neural network to generate the set of one or more improved humanized intermediate candidate sequences comprises instructions to:

define contact residue regions that remain unchanged during affinity improvement;

restrict sequence modifications to non-interaction residues; and generate the set of one or more improved humanized candidate sequences.

9. The system of claim 1, wherein the instruction to input the humanized intermediate candidate sequence and the one or more contact residue regions into a deep neural network to generate a set of one or more improved humanized candidate sequences comprises instructions to:

establish the preservation constraints as including a feature of the contact residue regions;

allow limited modification of the contact residue regions within a predefined extent;

iteratively adjust candidate sequences based on both affinity and humanization scores.

10. The system of claim 1, wherein the instruction to replace the windows of protein sequence with the humanized regions comprises instructions to:

retrieve structural data from crystallography, cryo-electron microscopy, or computational structure prediction;

identify conserved structural features that are maintained during humanization;

validate humanized candidate sequences through structural stability simulations; and select candidates that maintain folding and binding interactions of the protein sequence.

11. The system of claim 1, wherein the instruction to input the humanized intermediate candidate sequence and the one or more contact residue regions into the deep neural network to generate the set of one or more improved humanized candidate sequences comprises instructions to:

use a transformer-based model trained on antibody sequence databases to predict affinity-enhancing mutations;

provide the one or more contact residue regions to the transformer-based model as the preservation constraints; and generate sequence modifications to the humanized intermediate candidate sequence using the transformer-based model.

12. The system of claim 1, wherein the instruction to input the humanized intermediate candidate sequence and the one or more contact residue regions into the deep neural network to generate the set of one or more improved humanized candidate sequences comprises instructions to:

use a diffusion model to generate incremental sequence modifications; and generate variants by iteratively refining the humanized intermediate candidate sequence.

13. The system of claim 1, wherein the instruction to input the humanized intermediate candidate sequence and the one or more contact residue regions into the deep neural network to generate the set of one or more improved humanized candidate sequences comprises instructions to:

employ a reinforcement learning technique to reward affinity while maintaining structural and functional constraints;

implement a reward-based learning that prioritizes rewarding the affinity; and generate an improved humanized candidate sequence.

14. The system of claim 1, wherein the instructions, when executed, further cause the one or more processors to:

collect experimental validation data on the set of one or more improved humanized candidate sequences;

feed back the experimental validation data as model training data; and retrain the deep neural network using the model training data.

15. The system of claim 1, wherein the majority of regions of the protein sequence originates from a rodent-derived antibody.

16. The system of claim 1, wherein the majority of regions of the protein sequence originates from a camelid nanobody.

17. The system of claim 1, wherein the protein sequence is an approved therapeutic entity.

18. The system of claim 1, wherein the instructions, when executed, further cause the one or more processors to distill the deep neural network to generate a second deep neural network using outputs of the deep neural network as training data of the second deep neural network.

19. A non-transitory computer-readable medium configured to store code comprising instructions, wherein the instructions, when executed by one or more processors, cause the one or more processors to:

receive a protein sequence that has a majority of regions originating from one or more non-target data sources that correspond to one or more non-human species;

replace windows of the protein sequence with humanized regions to generate a humanized intermediate candidate sequence;

identify one or more contact residue regions in the humanized intermediate candidate sequence, wherein the one or more contact residue regions are verifiable from laboratory tests to be regions that interact with a drug target molecule;

input the humanized intermediate candidate sequence and the one or more contact residue regions into a deep neural network to generate a set of one or more improved humanized candidate sequences that have higher affinity than the protein sequence to the drug target molecule, wherein the one or more contact residue regions are inputted as preservation constraints; and output the set of one or more improved humanized candidate sequences to be stored in the data store.

20. A computer-implemented method, comprising:

receiving a protein sequence that has a majority of regions originating from one or more non-target data sources that correspond to one or more non-human species;

replacing windows of the protein sequence with humanized regions to generate a humanized intermediate candidate sequence;

identifying one or more contact residue regions in the humanized intermediate candidate sequence, wherein the one or more contact residue regions are verifiable from laboratory tests to be regions that interact with a drug target molecule;

inputting the humanized intermediate candidate sequence and the one or more contact residue regions into a deep neural network to generate a set of one or more improved humanized candidate sequences that have higher affinity than the protein sequence to the drug target molecule, wherein the one or more contact residue regions are inputted as preservation constraints; and outputting the set of one or more improved humanized candidate sequences to be stored in the data store.

* * * * *